US008849895B2

(12) United States Patent
Bodin et al.

(10) Patent No.: US 8,849,895 B2
(45) Date of Patent: Sep. 30, 2014

(54) ASSOCIATING USER SELECTED CONTENT MANAGEMENT DIRECTIVES WITH USER SELECTED RATINGS

(75) Inventors: William K. Bodin, Austin, TX (US); David Jaramillo, Lake Worth, FL (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/372,329

(22) Filed: Mar. 9, 2006

(65) Prior Publication Data

US 2007/0214149 A1    Sep. 13, 2007

(51) Int. Cl.
G06F 15/16       (2006.01)
G06F 17/30       (2006.01)
H04L 29/08       (2006.01)

(52) U.S. Cl.
CPC ........... *G06F 17/30032* (2013.01); *H04L 67/26* (2013.01)
USPC .......................................... 709/203; 707/694

(58) Field of Classification Search
USPC .................. 709/718, 203, 217, 219
See application file for complete search history.

(56) References Cited

U.S. PATENT DOCUMENTS

| 5,819,220 | A   | 10/1998 | Sarukkai et al. |
| 5,892,825 | A   | 4/1999  | Mages et al. |
| 5,901,287 | A   | 5/1999  | Bull et al. |
| 5,911,776 | A   | 6/1999  | Guck |
| 6,032,260 | A   | 2/2000  | Sasmazel et al. |
| 6,061,718 | A   | 5/2000  | Nelson |
| 6,141,693 | A   | 10/2000 | Perlman et al. |
| 6,178,511 | B1  | 1/2001  | Cohen et al. |
| 6,219,638 | B1  | 4/2001  | Padmanabhan |
| 6,240,391 | B1  | 5/2001  | Ball et al. |
| 6,266,649 | B1* | 7/2001  | Linden et al. ................ 705/26 |
| 6,311,194 | B1  | 10/2001 | Sheth et al. |
| 6,343,329 | B1  | 1/2002  | Landgraf |
| 6,463,440 | B1  | 10/2002 | Hind et al. |
| 6,519,617 | B1  | 2/2003  | Wanderski et al. |
| 6,771,743 | B1  | 8/2004  | Butler et al. |
| 6,912,691 | B1  | 6/2005  | Dodrill et al. |

(Continued)

FOREIGN PATENT DOCUMENTS

| JP | 2004312208 | 11/2004 |
| JP | 2005149490 | 6/2005  |

(Continued)

OTHER PUBLICATIONS

Text to Speech MP3 with Natural Voices 1.71, Published Oct. 5, 2004.

(Continued)

*Primary Examiner* — Jimmy H Tran
(74) *Attorney, Agent, or Firm* — Brevetto Law Group

(57) ABSTRACT

Methods, systems, and products are disclosed for associating user selected content management directives with a user selected rating. Embodiments include presenting to a user a plurality of predefined content management directives; receiving from a user an identification of a particular content management directive; receiving from a user an identification of the rating to invoke the content management directive; and storing the identification of the content management directive in association with the rating to invoke the content management directives.

12 Claims, 26 Drawing Sheets

(56) References Cited

U.S. PATENT DOCUMENTS

| | | | |
|---|---|---|---|
| 6,944,591 B1 | 9/2005 | Raghunandan | |
| 6,965,569 B1 | 11/2005 | Carolan et al. | |
| 6,975,989 B2 | 12/2005 | Sasaki | |
| 6,976,082 B1 | 12/2005 | Ostermann et al. | |
| 6,981,023 B1 | 12/2005 | Hamilton | |
| 6,993,476 B1 | 1/2006 | Dutta et al. | |
| 7,039,643 B2 | 5/2006 | Sena et al. | |
| 7,046,772 B1 | 5/2006 | Moore et al. | |
| 7,062,437 B2 | 6/2006 | Kovales et al. | |
| 7,120,702 B2 | 10/2006 | Huang et al. | |
| 7,130,850 B2 | 10/2006 | Russell-Falla et al. | |
| 7,171,411 B1 | 1/2007 | Lewis et al. | |
| 7,313,528 B1 | 12/2007 | Miller | |
| 7,356,470 B2 | 4/2008 | Roth et al. | |
| 7,366,712 B2 | 4/2008 | He et al. | |
| 7,437,351 B2* | 10/2008 | Page | 1/1 |
| 7,454,346 B1 | 11/2008 | Dodrill et al. | |
| 7,546,288 B2 | 6/2009 | Springer, Jr. | |
| 7,657,006 B2 | 2/2010 | Woodring | |
| 7,743,009 B2* | 6/2010 | Hangartner et al. | 706/46 |
| 7,849,159 B2 | 12/2010 | Elman | |
| 7,908,270 B2* | 3/2011 | Spiegelman | 707/726 |
| 8,510,277 B2* | 8/2013 | Bodin et al. | 707/694 |
| 8,706,731 B2* | 4/2014 | Cho et al. | 707/737 |
| 2001/0027396 A1 | 10/2001 | Sato | |
| 2001/0040900 A1 | 11/2001 | Salmi et al. | |
| 2001/0047349 A1* | 11/2001 | Easty et al. | 707/3 |
| 2001/0049725 A1 | 12/2001 | Kosuge | |
| 2001/0054074 A1* | 12/2001 | Hayashi | 709/206 |
| 2002/0013708 A1 | 1/2002 | Walker et al. | |
| 2002/0032564 A1 | 3/2002 | Ehsani et al. | |
| 2002/0032776 A1* | 3/2002 | Hasegawa et al. | 709/225 |
| 2002/0054090 A1 | 5/2002 | Silva et al. | |
| 2002/0062216 A1 | 5/2002 | Guenther et al. | |
| 2002/0062393 A1 | 5/2002 | Borger et al. | |
| 2002/0083013 A1 | 6/2002 | Rollins et al. | |
| 2002/0095292 A1 | 7/2002 | Mittal et al. | |
| 2002/0152210 A1 | 10/2002 | Johnson et al. | |
| 2002/0178007 A1 | 11/2002 | Slotznick et al. | |
| 2002/0184028 A1 | 12/2002 | Sasaki | |
| 2002/0194286 A1 | 12/2002 | Matsuura et al. | |
| 2002/0194480 A1 | 12/2002 | Nagao | |
| 2002/0198720 A1 | 12/2002 | Takagi et al. | |
| 2003/0028380 A1 | 2/2003 | Freeland et al. | |
| 2003/0033331 A1 | 2/2003 | Sena et al. | |
| 2003/0051083 A1 | 3/2003 | Striemer | |
| 2003/0055868 A1 | 3/2003 | Fletcher et al. | |
| 2003/0103606 A1 | 6/2003 | Rhie et al. | |
| 2003/0110272 A1 | 6/2003 | du Castel et al. | |
| 2003/0110297 A1 | 6/2003 | Tabatabai et al. | |
| 2003/0115056 A1 | 6/2003 | Gusler et al. | |
| 2003/0115064 A1 | 6/2003 | Gusler et al. | |
| 2003/0126293 A1 | 7/2003 | Bushey | |
| 2003/0132953 A1 | 7/2003 | Johnson et al. | |
| 2003/0139144 A1 | 7/2003 | Kitajima | |
| 2003/0158737 A1* | 8/2003 | Csicsatka | 704/273 |
| 2003/0160770 A1* | 8/2003 | Zimmerman | 345/204 |
| 2003/0167234 A1 | 9/2003 | Bodmer et al. | |
| 2003/0172066 A1 | 9/2003 | Cooper et al. | |
| 2003/0188255 A1 | 10/2003 | Shimizu et al. | |
| 2003/0229847 A1 | 12/2003 | Kim | |
| 2004/0003394 A1* | 1/2004 | Ramaswamy | 725/28 |
| 2004/0005040 A1 | 1/2004 | Owens | |
| 2004/0034653 A1 | 2/2004 | Maynor et al. | |
| 2004/0041835 A1 | 3/2004 | Lu | |
| 2004/0046778 A1 | 3/2004 | Niranjan | |
| 2004/0054627 A1* | 3/2004 | Rutledge | 705/50 |
| 2004/0068552 A1* | 4/2004 | Kotz et al. | 709/218 |
| 2004/0088349 A1 | 5/2004 | Beck et al. | |
| 2004/0199375 A1 | 10/2004 | Ehsani et al. | |
| 2004/0201609 A1 | 10/2004 | Obrador | |
| 2004/0254851 A1* | 12/2004 | Himeno et al. | 705/26 |
| 2005/0002503 A1 | 1/2005 | Owens | |
| 2005/0015254 A1 | 1/2005 | Bearman | |
| 2005/0045373 A1 | 3/2005 | Born | |
| 2005/0071780 A1 | 3/2005 | Muller et al. | |
| 2005/0076365 A1* | 4/2005 | Popov et al. | 725/46 |
| 2005/0108521 A1 | 5/2005 | Silhavy et al. | |
| 2005/0191994 A1 | 9/2005 | May | |
| 2005/0192061 A1 | 9/2005 | May | |
| 2005/0203959 A1 | 9/2005 | Muller et al. | |
| 2005/0226217 A1 | 10/2005 | Logemann | |
| 2005/0232242 A1 | 10/2005 | Karaoguz et al. | |
| 2005/0251513 A1 | 11/2005 | Tenazas | |
| 2006/0007820 A1 | 1/2006 | Adams | |
| 2006/0008258 A1 | 1/2006 | Kawana et al. | |
| 2006/0020662 A1 | 1/2006 | Robinson | |
| 2006/0031364 A1 | 2/2006 | Hamilton | |
| 2006/0048212 A1 | 3/2006 | Tsuruoka et al. | |
| 2006/0050794 A1 | 3/2006 | Tan et al. | |
| 2006/0052089 A1 | 3/2006 | Khurana et al. | |
| 2006/0075224 A1 | 4/2006 | Tao | |
| 2006/0095848 A1 | 5/2006 | Naik | |
| 2006/0114987 A1 | 6/2006 | Roman | |
| 2006/0123082 A1 | 6/2006 | Digate et al. | |
| 2006/0136449 A1 | 6/2006 | Parker et al. | |
| 2006/0140360 A1 | 6/2006 | Crago et al. | |
| 2006/0149781 A1 | 7/2006 | Blankinship | |
| 2006/0155698 A1 | 7/2006 | Vayssiere | |
| 2006/0159109 A1 | 7/2006 | Lamkin et al. | |
| 2006/0168507 A1 | 7/2006 | Hansen | |
| 2006/0173985 A1 | 8/2006 | Moore | |
| 2006/0184679 A1 | 8/2006 | Izdepski et al. | |
| 2006/0190616 A1 | 8/2006 | Mayerhofer et al. | |
| 2006/0193450 A1 | 8/2006 | Flynt | |
| 2006/0195512 A1* | 8/2006 | Rogers et al. | 709/203 |
| 2006/0195540 A1 | 8/2006 | Hamilton | |
| 2006/0206533 A1 | 9/2006 | MacLaurin et al. | |
| 2006/0218187 A1* | 9/2006 | Plastina et al. | 707/104.1 |
| 2006/0224739 A1 | 10/2006 | Anantha | |
| 2006/0233327 A1 | 10/2006 | Roberts et al. | |
| 2006/0265503 A1 | 11/2006 | Jones et al. | |
| 2006/0282317 A1 | 12/2006 | Rosenberg | |
| 2006/0288011 A1 | 12/2006 | Gandhi et al. | |
| 2007/0027958 A1 | 2/2007 | Haslam | |
| 2007/0033239 A1* | 2/2007 | Beaule et al. | 707/205 |
| 2007/0043759 A1 | 2/2007 | Bodin et al. | |
| 2007/0061229 A1 | 3/2007 | Ramer et al. | |
| 2007/0061266 A1 | 3/2007 | Moore et al. | |
| 2007/0067429 A1* | 3/2007 | Jain et al. | 709/223 |
| 2007/0073728 A1 | 3/2007 | Klein et al. | |
| 2007/0077921 A1 | 4/2007 | Hayashi et al. | |
| 2007/0078655 A1 | 4/2007 | Semkow et al. | |
| 2007/0083540 A1 | 4/2007 | Gundla et al. | |
| 2007/0091206 A1 | 4/2007 | Bloebaum | |
| 2007/0100836 A1 | 5/2007 | Eichstaedt et al. | |
| 2007/0112844 A1 | 5/2007 | Tribble et al. | |
| 2007/0118426 A1 | 5/2007 | Barnes, Jr. | |
| 2007/0124458 A1 | 5/2007 | Kumar | |
| 2007/0124802 A1 | 5/2007 | Anton et al. | |
| 2007/0130589 A1 | 6/2007 | Davis et al. | |
| 2007/0147274 A1 | 6/2007 | Vasa et al. | |
| 2007/0174326 A1 | 7/2007 | Schwartz et al. | |
| 2007/0191008 A1 | 8/2007 | Bucher et al. | |
| 2007/0192327 A1 | 8/2007 | Bodin | |
| 2007/0192674 A1 | 8/2007 | Bodin | |
| 2007/0192683 A1 | 8/2007 | Bodin | |
| 2007/0192684 A1 | 8/2007 | Bodin et al. | |
| 2007/0194286 A1 | 8/2007 | Kaner | |
| 2007/0206738 A1 | 9/2007 | Patel | |
| 2007/0208687 A1 | 9/2007 | O'Connor et al. | |
| 2007/0213857 A1 | 9/2007 | Bodin | |
| 2007/0213986 A1 | 9/2007 | Bodin | |
| 2007/0214147 A1* | 9/2007 | Bodin et al. | 707/10 |
| 2007/0214148 A1 | 9/2007 | Bodin | |
| 2007/0214149 A1* | 9/2007 | Bodin et al. | 707/10 |
| 2007/0214485 A1 | 9/2007 | Bodin | |
| 2007/0220024 A1 | 9/2007 | Putterman et al. | |
| 2007/0239713 A1* | 10/2007 | Leblang et al. | 707/6 |
| 2007/0253699 A1 | 11/2007 | Yen et al. | |
| 2007/0276837 A1 | 11/2007 | Bodin | |
| 2007/0276865 A1 | 11/2007 | Bodin | |
| 2007/0276866 A1 | 11/2007 | Bodin et al. | |
| 2007/0277088 A1 | 11/2007 | Bodin | |

(56) References Cited

U.S. PATENT DOCUMENTS

| | | | |
|---|---|---|---|
| 2007/0277233 A1 | 11/2007 | Bodin | |
| 2008/0034278 A1 | 2/2008 | Tsou et al. | |
| 2008/0052415 A1 | 2/2008 | Kellerman et al. | |
| 2008/0082576 A1 | 4/2008 | Bodin | |
| 2008/0082635 A1 | 4/2008 | Bodin | |
| 2008/0131948 A1 | 6/2008 | Manzer | |
| 2008/0155079 A1* | 6/2008 | Spiegelman | 709/223 |
| 2008/0161948 A1 | 7/2008 | Bodin | |
| 2008/0162131 A1 | 7/2008 | Bodin | |
| 2008/0275893 A1 | 11/2008 | Bodin et al. | |
| 2009/0132453 A1* | 5/2009 | Hangartner et al. | 706/46 |

FOREIGN PATENT DOCUMENTS

| | | |
|---|---|---|
| JP | 2007011893 | 1/2007 |
| WO | WO 0182139 | 11/2001 |
| WO | WO 2005/106846 | 11/2005 |

OTHER PUBLICATIONS

Managing multimedia content and delivering services across multiple client platforms using XML, London Communications Symposium, xx, xx, Sep. 10, 2002, pp. 1-7.
PCT Search Report and Written Opinion International Application PCT/EP2007/050594.
Adapting Multimedia Internet Content for Universal Access, Rakesh Mohan, John R. Smith, Chung-Sheng Li, IEEE Transactions on Multimedia vol. 1, No. 1, p. 104-p. 144.
Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.
U.S. Appl. No. 11/352,760, filed Feb. 2006, Bodin et al.
U.S. Appl. No. 11/352,824, filed Feb. 2006, Bodin et al.
U.S. Appl. No. 11/352,680, filed Feb. 2006, Bodin et al.
U.S. Appl. No. 11/352,679, filed Feb. 2006, Bodin et al.
U.S. Appl. No. 11/372,323, filed Mar. 2006, Bodin et al.
U.S. Appl. No. 11/372,318, filed Mar. 2006, Bodin et al.
U.S. Appl. No. 11/372,319, filed Mar. 2006, Bodin et al.
U.S. Appl. No. 11/536,781, filed Sep. 2006, Bodin et al.
U.S. Appl. No. 11/420,014, filed May 2006, Bodin et al.
U.S. Appl. No. 11/420,015, filed May 2006, Bodin et al.
U.S. Appl. No. 11/420,016, filed May 2006, Bodin et al.
U.S. Appl. No. 11/420,017, filed May 2006, Bodin et al.
U.S. Appl. No. 11/420,018, filed May 2006, Bodin et al.
U.S. Appl. No. 11/536,733, filed Sep. 2006, Bodin et al.
U.S. Appl. No. 11/619,216, filed Jan. 2007, Bodin et al.
U.S. Appl. No. 11/619,253, filed Jan. 2007, Bodin et al.
U.S. Appl. No. 12/178,448, filed Jul. 2008, Bodin et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.
Final Office Action Dated Jul. 09, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.
Office Action Dated Jun. 25, 2010 in U.S. Appl. No. 11/619,216.
Advertisement from Odiogo, LLC, San Franscisco, CA (author unknown); Odiogo.com (from WayBack Machine archive); pp. 1-10; Oct. 23, 2005.
Advertisement from Tucows Inc., Toronto, Canada (author unknown) for "FeedDemon Version 1.0" software; from www.bradsoft.com website; 1-11; Dec.18, 2003.
OdioFo, Screen Dumps from www.odiogo.com web site, 11 pafes total. Archive date Oct. 23, 2005, downloaded from WayBack Machine, <"http://web.archive.org/web/20051023004244/www.odiogo.com/">.
N.Bradbury, "FeedDemon Version 1.0," © Dec. 18, 2003, bradsoft.com, series of 11 screen dumps illustrating aspects of the software, 11 pages titak nymbered 1-11 if 11.
U.S. Appl. No. 11/352,680 Office Action mailed Jun. 23, 2009.
U.S. Appl. No. 11/372,317 Office Action mailed Jul. 8, 2009.
U.S. Appl. No. 11/536,733 Final Office Action mailed Jul. 22, 2009.
U.S. Appl. No. 11/420,017 Office Action mailed Jul. 9, 2009.
U.S. Appl. No. 11/536,781 Office Action mailed Jul. 17, 2009.
U.S. Appl. No. 11/420,014 Office Action mailed Jul. 23, 2009.
U.S. Appl. No. 11/420,018 Final Office Action mailed Jul. 21, 2009.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.
Heslop et al., "Microsoft Office Word 2003 Bible", 2003, pp. 29-30, 39, 505-517, Wiley Publishing Inc., Indianapolis, Indiana, USA.

* cited by examiner

ASSOCIATING USER SELECTED CONTENT MANAGEMENT DIRECTIVES WITH USER SELECTED RATINGS

BACKGROUND OF THE INVENTION

1. Field of the Invention

The field of the invention is data processing, or, more specifically, methods, systems, and products for associating user selected content management directives with user selected ratings.

2. Description Of Related Art

Despite having more access to content from many disparate sources and having more disparate devices to access that content, retrieving content from disparate sources with disparate devices is often cumbersome. Accessing such content is cumbersome because users typically must access content of various disparate data types from various disparate data sources individually without having a single point of access for accessing content. Content of disparate data types accessed from various disparate data sources often must also be rendered on data type-specific devices using data type-specific applications without the flexibility of rendering content on user selected devices regardless of the content's original data type. There is therefore an ongoing need for consolidated content management for delivery to a particular rendering device.

SUMMARY OF THE INVENTION

Methods, systems, and products are disclosed for associating user selected content management directives with a user selected rating. Embodiments include presenting to a user a plurality of predefined content management directives; receiving from a user an identification of a particular content management directive; receiving from a user an identification of the rating to invoke the content management directive; and storing the identification of the content management directive in association with the rating to invoke the content management directives.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary Architecture for Consolidated Content Management

Figure 1:
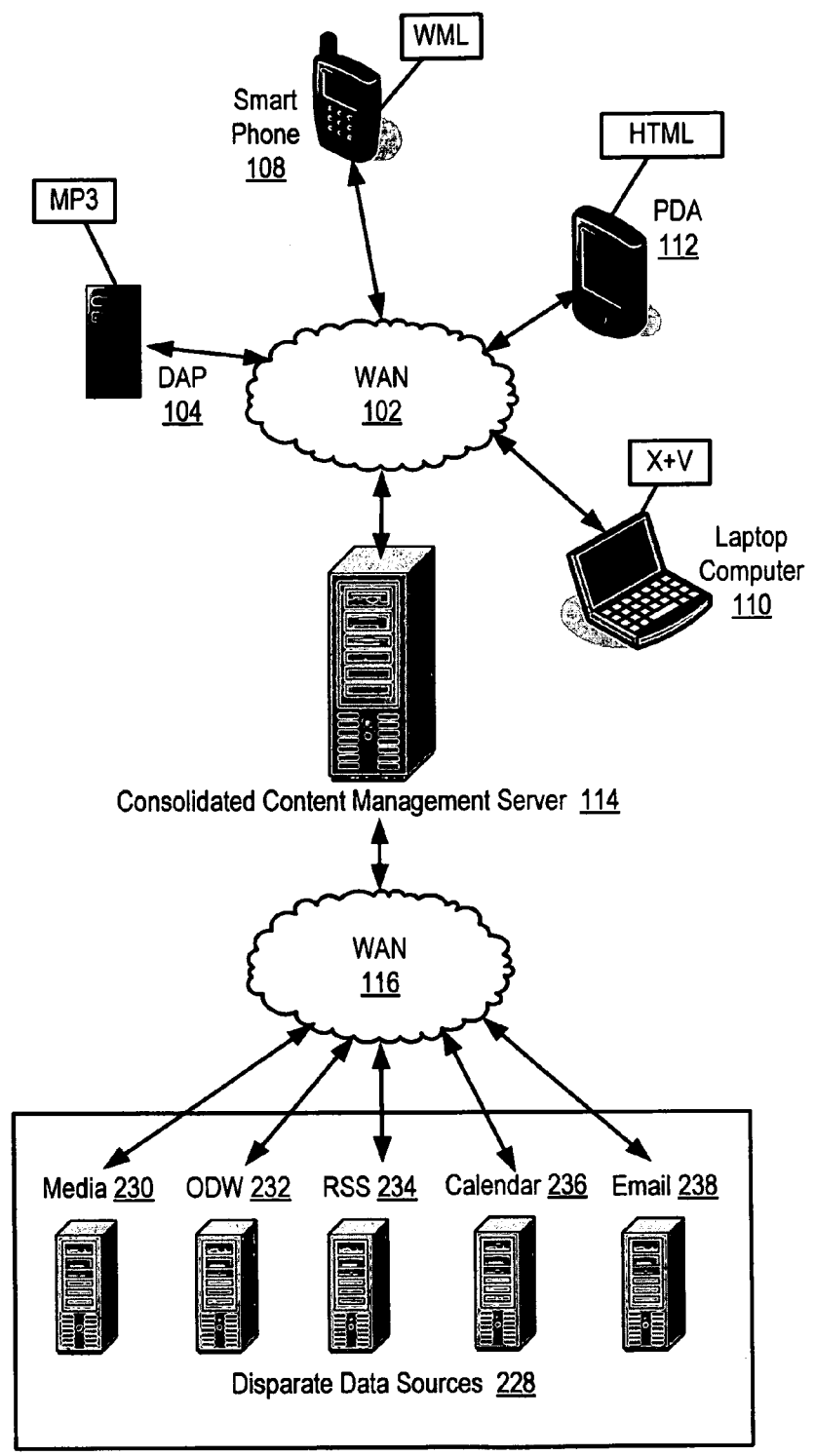
FIG. 1 sets forth a network diagram illustrating an exemplary system for consolidated content management for delivery to a rendering device according to embodiments of the present invention.

Exemplary methods, systems, and products for consolidated content management for delivery to a rendering device according to embodiments of the present invention are described with reference to the accompanying drawings, beginning with FIG. 1. FIG. 1 sets forth a network diagram illustrating an exemplary system for consolidated content management for delivery to a rendering device according to embodiments of the present invention. The system of FIG. 1 operates generally for consolidated content management for delivery to a rendering device by aggregating, for a user, content of disparate data types from disparate data sources; synthesizing the aggregated content of disparate data types into synthesized content including data of a uniform data type for delivery to a particular rendering device; receiving from the rendering device a request for the synthesized content; and transmitting, in a response to the request, the requested synthesized content to the rendering device.

Content of disparate data types are content of data of different kind and form. That is, disparate data types are data of different kinds. The distinctions that define the disparate data types may include a difference in data structure, file format, protocol in which the data is transmitted, application used to render the data, and other distinctions as will occur to those of skill in the art. Examples of disparate data types include MPEG-1 Audio Layer 3 ('MP3') files, eXtensible markup language documents ('XML'), email documents, word processing documents, calendar data, and so on as will occur to those of skill in the art. Disparate data types often rendered on data type-specific devices. For example, an MPEG-1 Audio Layer 3 ('MP3') file is typically played by an MP3 player, a Wireless Markup Language ('WML') file is typically accessed by a wireless device, and so on.

The term disparate data sources means sources of data of disparate data types. Such data sources may be any device or network location capable of providing access to data of a disparate data type. Examples of disparate data sources include servers serving up files, web sites, cellular phones, PDAs, MP3 players, and so on as will occur to those of skill in the art.

The data processing system of FIG. 1 includes a wide area network ("WAN") (116) including a number of disparate data sources (228) operating as disparate data sources and a consolidated content management server (114) for consolidated content management according to the present invention. The exemplary system of FIG. 1 includes a media server (230) providing content in the form of media files such as, for example, MP3 files. The exemplary system of FIG. 1 includes an IBM On Demand Workstation (232) a server providing support for an On Demand Workplace ('ODW') that provides productivity tools, and a virtual space to share ideas and expertise, collaborate with others, and find information.

The exemplary system of FIG. 1 includes an RSS server (234) providing content through RSS feeds. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This content is typically delivered as an XML file called RSS feed, webfeed, RSS stream, or RSS channel.

The system of FIG. 1 includes a calendar data server (236) that maintains calendar data for a user. The system of FIG. 1 also includes an email server (238).

The system of FIG. 1 includes a consolidated content management server (114). The consolidated content management server (114) provides consolidated content management of content from the disparate data sources (228) for delivery to one or more rendering devices (104, 108, 110, and 112). The consolidated content management server (114) is capable generally of aggregating, for a user, content of disparate data types from disparate data sources; synthesizing the aggregated content of disparate data types into synthesized content including data of a uniform data type for delivery to a particular rendering device (104, 108, 110, and 112); receiving from the rendering device (104, 108, 110, and 112) a request for the synthesized content; and transmitting, in a response to the request, the requested synthesized content to the rendering device (104, 108, 110, and 112).

The system of FIG. 1 includes a number of rendering devices (104, 108, 110, and 112) connected to a WAN (102). The rendering devices of FIG. 1 include a digital audio player ('DAP') (104) capable of playing MP3 files. An example of such a DAP is an ipod currently available from Apple. The rendering devices of FIG. 1 include smart phone (108) capable of rendering content in wireless markup language ('WML') and a personal digital assistant ('PDA') (112) capable of rendering content in the hypertext transfer markup language ('HTML').

The rendering devices of FIG. 1 also include a laptop computer (110) capable of supporting a multimodal browser for rendering content in XHTML plus Voice. XHTML plus Voice ('X+V') is a Web markup language for developing multimodal applications, by enabling voice in a presentation layer with voice markup. X+V provides voice-based interaction in small and mobile devices using both voice and visual elements. X+V is composed of three main standards: XHTML, VoiceXML, and XML Events. Given that the Web application environment is event-driven, X+V incorporates the Document Object Model (DOM) eventing framework used in the XML Events standard. Using this framework, X+V defines the familiar event types from HTML to create the correlation between visual and voice markup.

Each of rendering devices is capable of requesting from the consolidated content management server (114) content that has been aggregated from the disparate data sources and synthesized into content of a uniform data type. The consolidated content management server transmits in response to the request the content in a data type specific to the rendering device thereby allowing the rendering device to render the content regardless of the native data type of content as provided by the original content provider.

Consider for example, email content provided by the email server (238). The consolidated content management server (114) is capable of aggregating for a user email content and synthesizing the email by extracting the email text and inserting the email text into a header field of an MP3 file. The consolidated content management server (114) transmits the MP3 file to the DAP (104) that supports the display of information extracted from header fields. In this example of consolidated content management, the DAP (104) is capable of rendering in its display email despite being only able to render media files and without requiring modification of the DAP.

Consolidated content management of the present invention advantageously provides a single point of access to a wide variety of content to a user and wide flexibility in the manner and upon which device that content is rendered.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
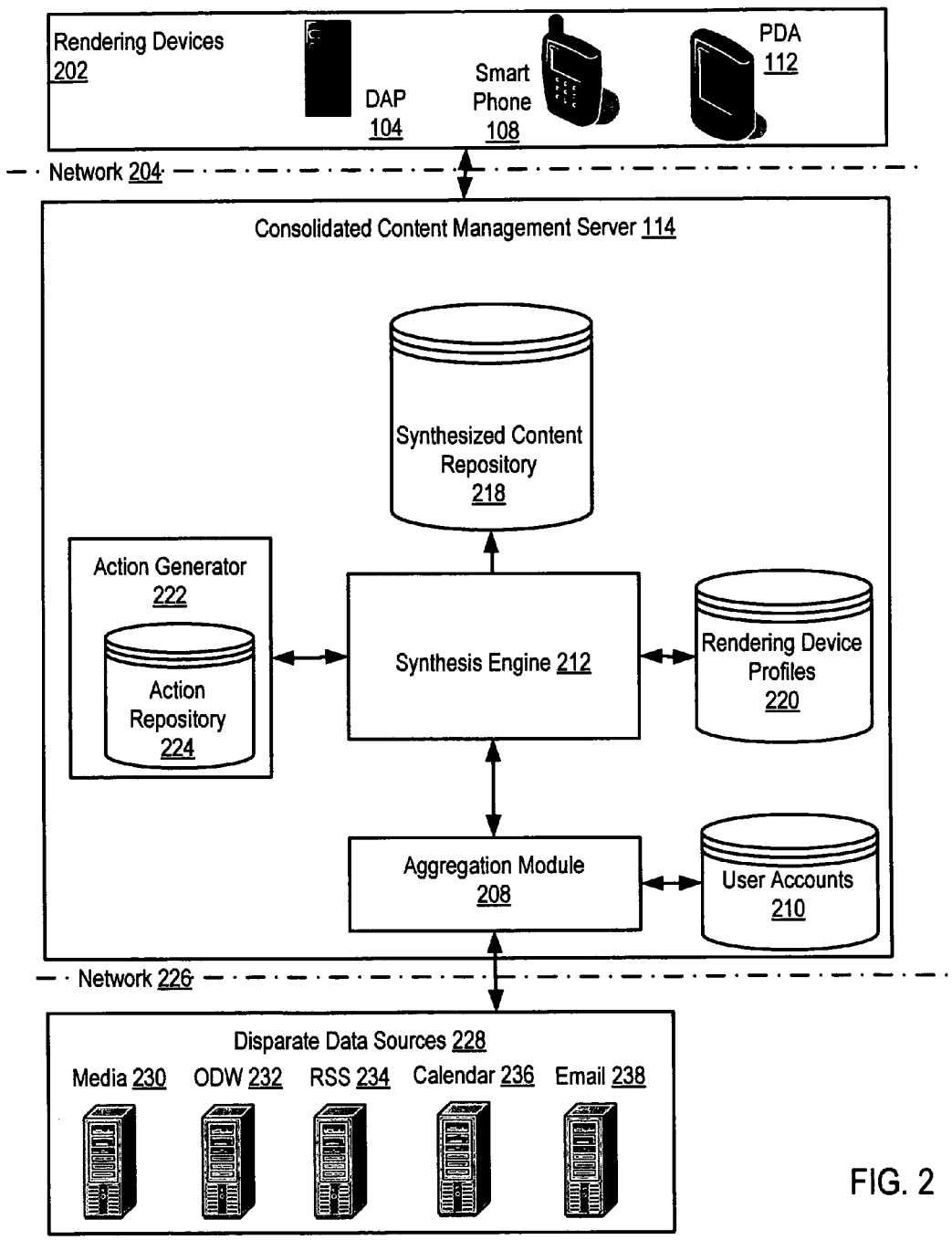
FIG. 2 sets forth a block diagram depicting a system for consolidated content management for delivery to a rendering device according to of the present invention.

For further explanation, FIG. 2 sets forth a block diagram depicting a system for consolidated content management for delivery to a rendering device according to of the present invention. The system of FIG. 2 includes a plurality of rendering devices (202) for rendering synthesized content provided by the consolidated content management server (114) aggregated from a plurality of disparate data sources (228). The consolidated content management server (114) is capable generally of aggregating, for a user, content of disparate data types from disparate data sources, (230, 232), 234, 236, and 238), (228); synthesizing the aggregated content of disparate data types into synthesized content including data of a particular data type for delivery to a particular rendering device (104, 108, or 112); receiving from the rendering device (104, 108, or 112) a request for the synthesized content; and transmitting, in a response to the request, the requested synthesized content to the rendering device (202).

The consolidated content management server (114) of FIG. 2 includes an aggregation module (208). The aggregation module (208) of FIG. 1 is implemented as computer program instructions for aggregating data of disparate data types from disparate data sources. The exemplary aggregation module (208) is capable generally of aggregating, for a user, content of disparate data types from disparate data sources by establishing a user account for the user; retrieving content of disparate data types from identified disparate data sources associated with the user account; storing the retrieved content; and associating the stored content with the user account as discussed in more detail below with reference to FIGS. 7-10.

The consolidated content management server (114) of FIG. 2 includes a synthesis engine (212). The synthesis engine of FIG. 1 is implemented as computer program instructions for synthesizing aggregated content of disparate data types into synthesized content including data of a uniform data type for delivery to a particular rendering device. The exemplary synthesis engine (212) is capable generally of synthesizing aggregated content of disparate data types into synthesized content including data of a uniform data type for delivery to a particular rendering device by identifying at least a portion of the aggregated content for delivery to the particular data rendering device; and translating the portion of the aggregated content into text content and markup associated with the text content in accordance with device profiles (220) for the rendering device as discussed in more detail below with reference to FIG. 11-14. The exemplary synthesis engine (212) is also capable generally of synthesizing aggregated content of disparate data types into synthesized content including data of a uniform data type for delivery to a particular rendering device by creating text in dependence upon the portion of the aggregated content; creating a media file for the synthesized content; and inserting the text in the header of the media file as discussed in more detail below with reference to FIG. 15.

The consolidated content management server (114) includes repository (218) of synthesized content. Maintaining a repository (218) of synthesized content provides a single point of access at the consolidated content management server for content aggregated from various disparate data sources (228) for rendering on a plurality of disparate rendering devices (104, 108, and 112). Because the content has been synthesized for delivery to the particular rendering devices (104, 108, and 112) the content may be rendered in a data format that the rendering devices support regardless of the original native data type of the content as served up by the disparate data sources (228).

Alternatively, content may be synthesized for delivery to a particular rendering device upon request for the synthesized data from a particular rendering device. Synthesizing data upon request for the data by a particular rendering device reduces the overhead of maintaining large repositories of synthesized content for a particular user and for delivery to a particular device.

The consolidated content management serer (114) also includes an action generator (222) containing a repository of actions (224). Synthesized content often has associated with it actions for execution on the rendering device. For example, content synthesized as X+V documents include grammars and actions providing voice navigation of the content thereby empowering a user to use speech to instruct the rendering of the content on the multimodal browser of a rendering device.

Consolidated content management in accordance with the present invention is generally implemented with computers, that is, with automated computing machinery. In the systems of FIGS. 1 and 2, for example, all the nodes, servers, and communications devices are implemented to some extent at least as computers. For further explanation, therefore, FIG. 3 sets forth a block diagram of automated computing machinery comprising an exemplary consolidated content management server (114) useful in consolidated content management for delivery to a rendering device according to embodiments of the present invention. The consolidated content management server (114) of FIG. 3 includes at least one computer processor (156) or 'CPU' as well as random access memory (168) ('RAM') which is connected through a system bus (160) to a processor (156) and to other components of the consolidated content management server (114).

Stored in RAM (168) is an exemplary consolidated content management module (140), computer program instructions for consolidated content management for delivery to a rendering device capable of aggregating, for a user, content of disparate data types from disparate data sources; synthesizing the aggregated content of disparate data types into synthesized content of a data type for delivery to a particular rendering device; receiving from the rendering device a request for the synthesized content; and transmitting, in a response to the request, the requested synthesized content to the rendering device.

The consolidated content management module (140) of FIG. 2 includes an aggregation module (208) computer program instructions for aggregating data of disparate data types from disparate data sources. The exemplary aggregation module (208) is capable generally of aggregating, for a user, content of disparate data types from disparate data sources by establishing a user account for the user; retrieving content of disparate data types from identified disparate data sources associated with the user account; storing the retrieved content; and associating the stored content with the user account as discussed in more detail below with reference to FIGS. 7-10.

The consolidated content management module (140) of FIG. 2 includes a synthesis engine (212) computer program instructions for synthesizing aggregated content of disparate data types into synthesized content including data of a uniform data type for delivery to a particular rendering device. The exemplary synthesis engine (212) is capable generally of synthesizing aggregated content of disparate data types into synthesized content including data of a uniform data type for delivery to a particular rendering device by identifying at least a portion of the aggregated content for delivery to the particular data rendering device; and translating the portion of the aggregated content into text content and markup associated with the text content in accordance with device profiles for the rendering device as discussed in more detail below with reference to FIG. 11-14. The exemplary synthesis engine (212) is also capable generally of synthesizing aggregated content of disparate data types into synthesized content including data of a uniform data type for delivery to a particular rendering device by creating text in dependence upon the portion of the aggregated content; creating a media file for the synthesized content; and inserting the text in the header of the media file as discussed in more detail below with reference to FIG. 15

Figure 3:
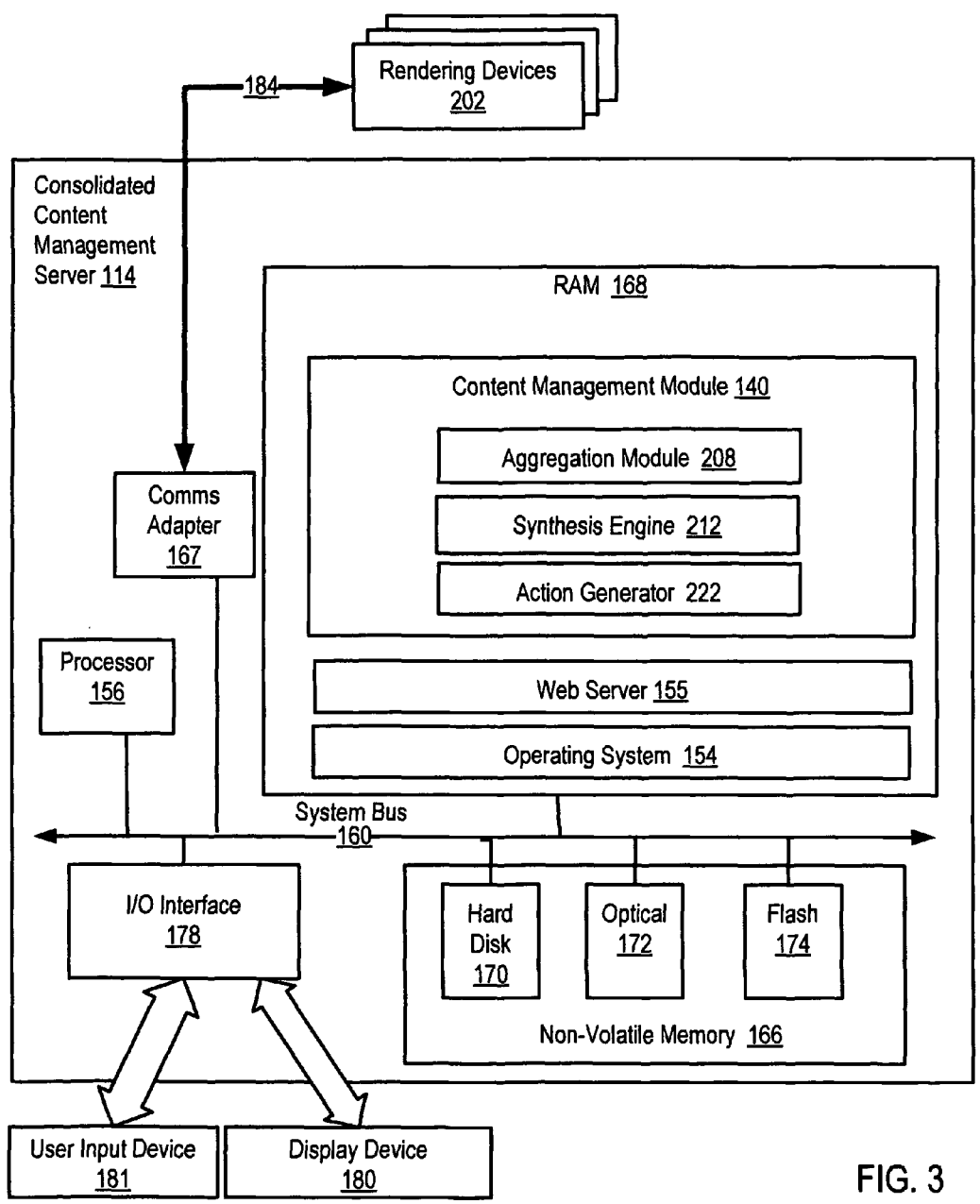
FIG. 3 sets forth a block diagram of automated computing machinery comprising an exemplary consolidated content management server useful in consolidated content management for delivery to a rendering device according to embodiments of the present invention.

The consolidated content management module (140) of FIG. 3 includes an action generator (222) computer program instructions for generating actions associated with synthesized content. Such actions are often executed on a rendering device to whom the synthesized content is transmitted.

The exemplary consolidated content management server (114) of FIG. 3 also includes a web server (155). Consolidated content management server may usefully provide synthesized content though the use of programs that run on a web server and build web pages, such as for example, servlets. Such programs may build dynamic server pages such as for example Java Server Pages ('JSP') containing synthesized content for delivery to a particular rendering device. On such web server useful in consolidated content management according to the present invention is the WebSphere® Application Server available from IBM. WebSphere Application Server is a Java™-based application platform, integrating enterprise data and transactions for the dynamic e-business. WebSphere Application Server delivers a rich application deployment environment with application services that provide transaction management, security, performance, availability, connectivity, and scalability.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art.

The exemplary consolidated content management server (114) of FIG. 3 includes non-volatile computer memory (166) coupled through a system bus (160) to a processor (156) and to other components of the consolidated content management server (114). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The exemplary consolidated content management server (114) of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary consolidated content management server (114) of FIG. 3 includes a communications adapter (167) for implementing data communications (184) with rendering devices (202). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for consolidated content management include modems for wired dial-up communications, Ethernet (IEEE 802.3) adapters for wired network communications, and 802.11b adapters for wireless network communications and other as will occur to those of skill in the art.

Consolidated Content Management for Delivery to a Rendering Device

Consolidated content management of the present invention advantageously provides a single point of access to a wide variety of content to a user and wide flexibility in the manner and upon which device that content is rendered. For further explanation, FIG. 4 sets forth a flow chart illustrating an exemplary computer-implemented method for consolidated content management for delivery to a rendering device. The method of FIG. 4 includes aggregating (402), for a user, content (404) of disparate data types from disparate data sources (228). Aggregated data is the accumulation, in a single location, of data of disparate types. The location of the aggregated data may be either physical, such as, for example, on a single computer containing aggregated data, or logical, such as, for example, a single interface providing access to the aggregated data.

Figure 4:
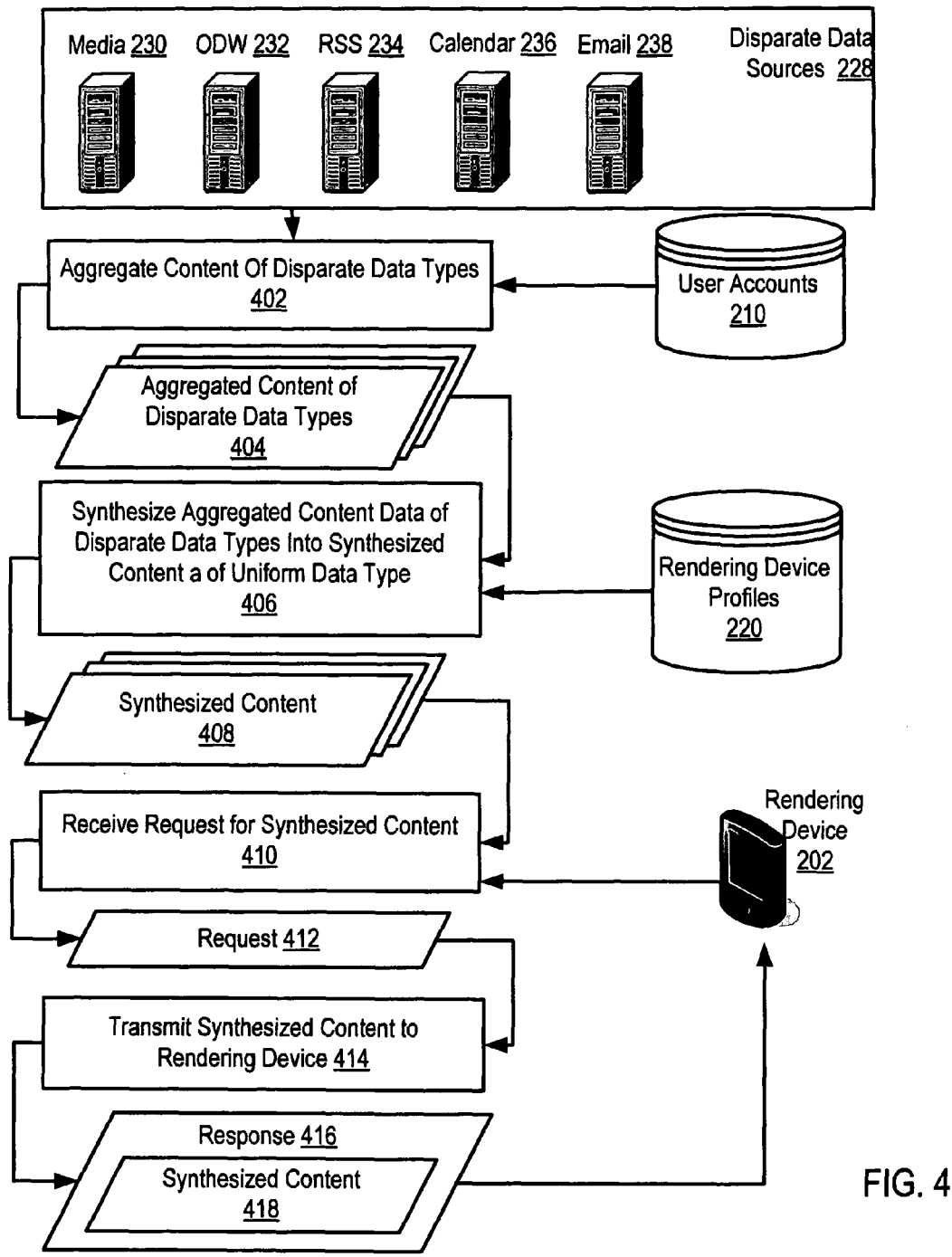
FIG. 4 sets forth a flow chart illustrating an exemplary computer-implemented method for consolidated content management for delivery to a rendering device.

Aggregating (402), for a user, content (404) of disparate data types from disparate data sources (228) according to the method of FIG. 4 is carried out in dependence upon user accounts (210) established for a user that contain identifications of user selected data sources for aggregation and identifications of one or more rendering devices upon which synthesized content is to be rendered. Aggregating, for a user, content of disparate data types from disparate data sources may be carried out by establishing a user account for the user; retrieving content of disparate data types from identified disparate data sources associated with the user account; storing the retrieved content; and associating the stored content with the user account as discussed in more detail below with reference to FIGS. 7-10.

The method of FIG. 4 also includes synthesizing (406) the aggregated content (404) of disparate data types into synthesized content (408) including data of a uniform data type for delivery to a particular rendering device (202). Synthesized content is content derived from aggregated data which has been synthesized for rendering upon a particular rendering device. That is, the content of the aggregated data is synthesized into data of a data type that a particular rendering device supports.

Synthesizing aggregated content of disparate data types into synthesized content including data of a uniform data type for delivery to a particular rendering device is typically carried out in dependence upon device profiles (220) identifying attributes of the particular rendering device such as file formats the device supports, markup languages the devices supports, data communications protocols the device supports, and other attributes as will occur to those of skill in the art. Synthesizing aggregated content of disparate data types into synthesized content including data of a uniform data type for delivery to a particular rendering device may be carried out by identifying at least a portion of the aggregated content for delivery to the particular data rendering device; and translating the portion of the aggregated content into text content and markup associated with the text content in accordance with device profiles for the rendering device as discussed in more detail below with reference to FIG. 11-14.

Synthesizing the aggregated content of disparate data types into synthesized content including data of a uniform data type for delivery to a particular rendering device may also be carried out by creating text in dependence upon the portion of the aggregated content; creating a media file for the synthesized content; and inserting the text in the header of the media file as discussed in more detail below with reference to FIG. 15.

Figure 5:
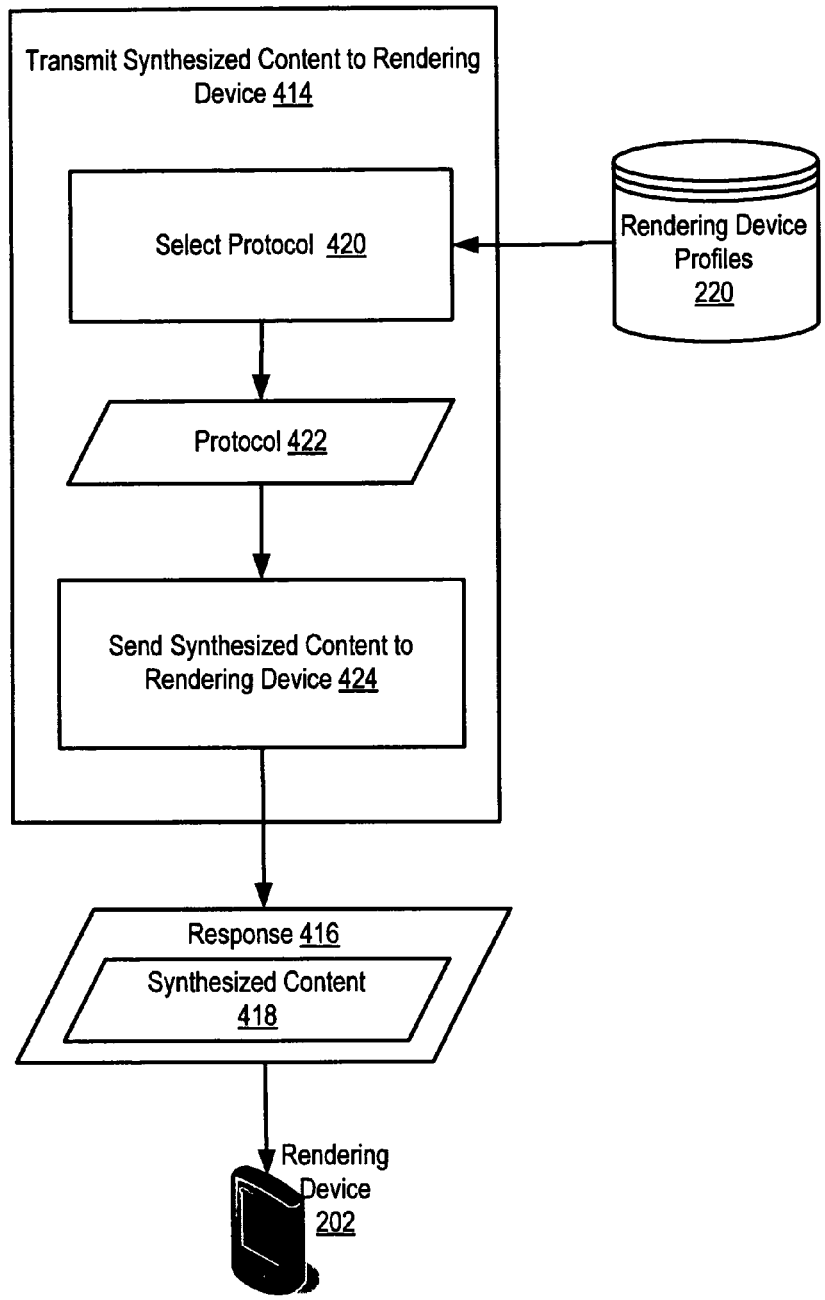
FIG. 5 sets forth a flow chart illustrating an exemplary method for transmitting requested synthesized content to a rendering device.

The method of FIG. 4 also includes receiving (410) from the rendering device (202) a request (412) for the synthesized content (408) and transmitting (414), in a response (416) to the request (412), the requested synthesized content (418) to the rendering device (202). For further explanation, FIG. 5 sets forth a flow chart illustrating an exemplary method for transmitting (414), in a response (416) to the request, the requested synthesized content (418) to the rendering device (202). Transmitting (414), in a response (416) to the request, the requested synthesized content (418) to the rendering device (202) according to the method of FIG. 5 includes selecting (420) a protocol (422) for transmission to the rendering device (202) in dependence upon a device profile (220) of the rendering device (202) and sending (424) the synthesized content (418) to the rendering device (202) in accordance with the protocol (422). Protocols useful in transmitting synthesized content to rendering devices in the Hypertext Transfer Protocol ('HTTP'), Wireless Access Protocol ('WAP'), Handheld Device Transport Protocol (HDTP') and many other as will occur to those of skill in the art.

As discussed above, synthesized content often has associated with it actions for execution on the rendering device. For example, content synthesized as X+V documents include grammars and actions providing voice navigation of the content thereby empowering a user to use speech to instruct the rendering of the content on the multimodal browser of a rendering device. For further explanation, FIG. 6 sets forth a flow chart illustrating additional aspects of consolidated content management for delivery according to the present invention. The method of FIG. 6 includes identifying (426) a rendering action (428) for execution by the rendering device (202). An rendering action is a set of computer instructions that when executed carry out a predefined task for rendering the synthesized content on the rendering device (202). The rendering action may be executed in dependence upon the synthesized data immediately or at some defined later time. Identifying (426) a rendering action (428) may be carried out by receiving a user instruction, selecting synthesized content in response to the user instruction, and selecting particular rendering method for rendering the synthesized content.

A user instruction is an event received in response to an act by a user. Exemplary user instructions include receiving events as a result of a user entering a combination of keystrokes using a keyboard or keypad, receiving speech from a user, receiving an event as a result of clicking on icons on a visual display by using a mouse, receiving an event as a result of a user pressing an icon on a touchpad, or other user instructions as will occur to those of skill in the art. Receiving a speech instruction from a user may be carried out by receiving speech from a user, converting the speech to text, and determining in dependence upon the text and a grammar associated with the synthesized content the user instruction.

Figure 6:
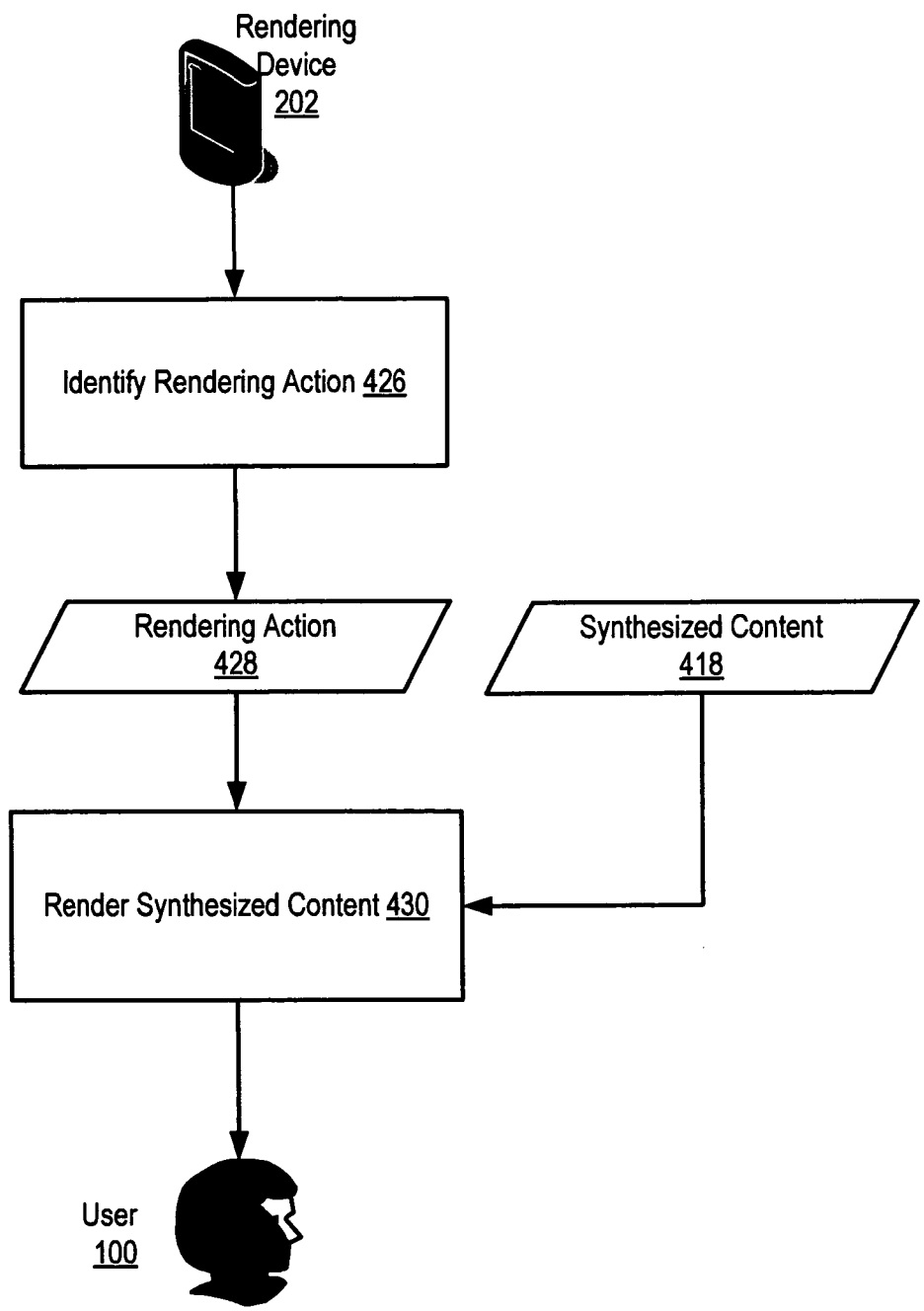
FIG. 6 sets forth a flow chart illustrating additional aspects of consolidated content management for delivery according to the present invention.

The method of FIG. 6 also includes rendering (430) the synthesized content (418), by the rendering device (202), in accordance with the rendering action (426). Rendering (430) the synthesized content (418), by the rendering device (202), in accordance with the rendering action (426) result in presenting to the user (100) the synthesize content using the facilities supported by the rendering device. Consider for example, email content synthesized by extracting the text from an email and inserting the text in the header of a media file for transmission to a digital audio player. Such a player includes a display function that displays text in the header of a media file which is often used to display metadata about a media file such as the name and artist of a song. Synthesizing the content of the email by including the text of the email in the header of a media file advantageously allows email to be rendered on the digital audio player without modification of the player itself.

In the examples above, synthesizing the aggregated content of disparate data types into synthesized content including data of a uniform data type for delivery to a particular rendering device is carried out by synthesizing the aggregated content of disparate data types into synthesized content including data of a uniform data type for delivery to a particular rendering device prior to receiving from the rendering device the request for the synthesized content. That is, content is synthesized for particular devices and stored such that the content is available to those particular devices. This is for explanation, and not for limitation. In fact, alternatively synthesizing the aggregated content of disparate data types into synthesized content for delivery to a particular rendering device may also be carried out by synthesizing the aggregated content of disparate data types into synthesized content including data of a uniform data type for delivery to a particular rendering device in response to receiving from the rendering device the request for the synthesized content.

Aggregating Content of Disparate Data Types from Disparate Data Sources for Single Point Access by a User As discussed above, consolidated content management typically includes aggregating for a user, content of disparate data types from disparate data sources. For further explanation, therefore, FIG. 7 sets forth a flow chart illustrating an exemplary computer implemented method for aggregating content of disparate data types from disparate data sources for single point access by a user. The method of FIG. 7 includes establishing (502) a user account (210) for the user (100). A user account (210) typically associates with a user a plurality of identified data sources, one or more rendering devices for rendering synthesized content, and various user preferences for both synthesizing content and rendering the content.

Figure 7:
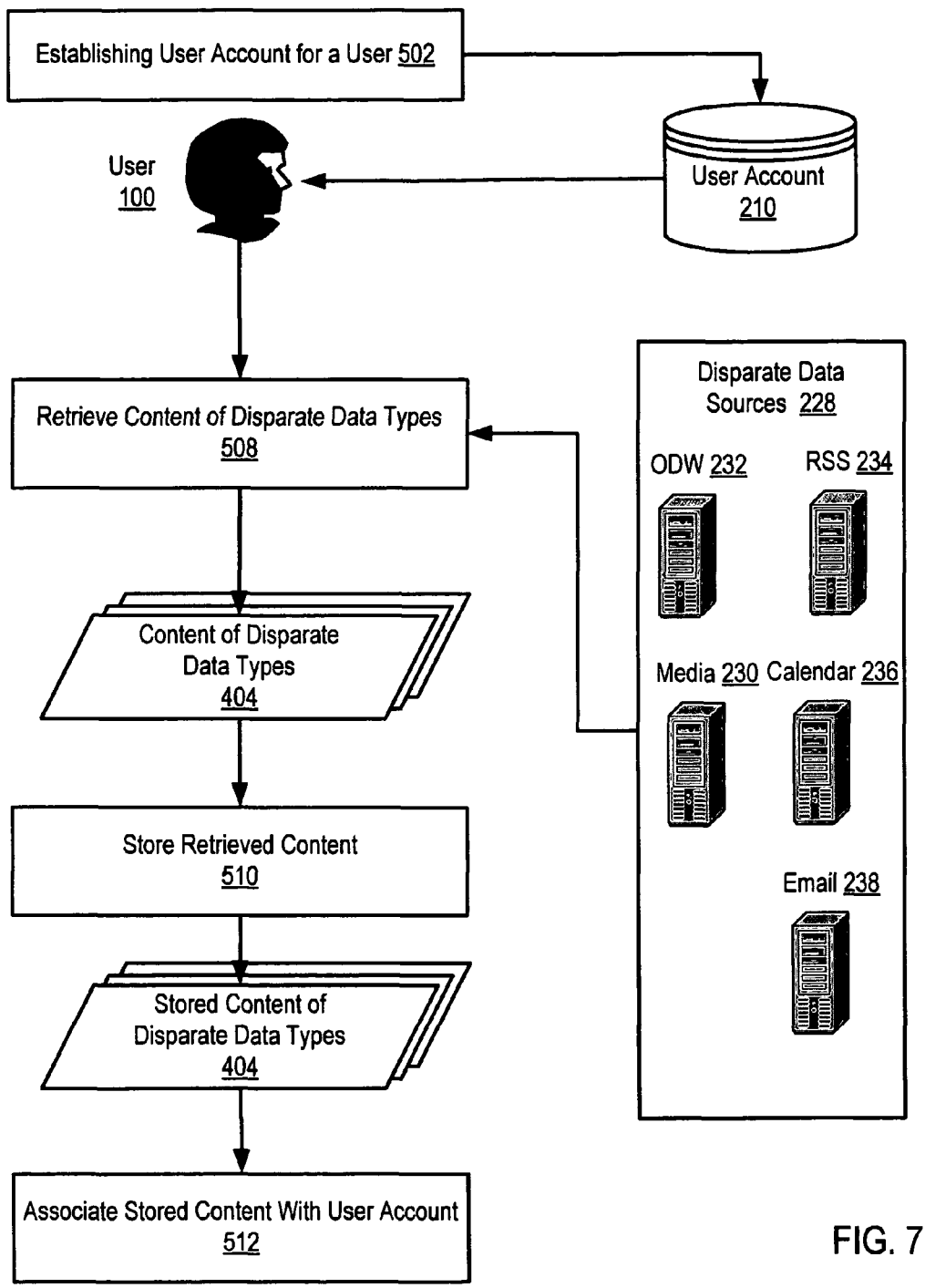
FIG. 7 sets forth a flow chart illustrating an exemplary computer implemented method for aggregating content of disparate data types from disparate data sources for single point access by a user.

The method of FIG. 7 also includes retrieving (508) content (404) of disparate data types from identified disparate data sources (228) associated with the user account (210). Retrieving (508) content (404) of disparate data types from identified disparate data sources (228) associated with the user account (210) may be carried out by retrieving the data from memory locally, downloading the data from a network location, or any other way of retrieving the requested data that will occur to those of skill in the art.

Some data sources may require security information for accessing data. Retrieving (508) content (404) of disparate data types from identified disparate data sources (228) associated with the user account (210) may therefore also include determining whether the identified data source requires security information to access the content and retrieving security information for the data source from the user account if the identified data source requires security information to access the content and presenting the security information to the data source to access the content.

The method of FIG. 7 also includes storing (510) the retrieved content (404) and associating (512) the stored content with the user account (210). The stored content is typically maintained in memory available to a consolidated content management server.

As discussed above, aggregating content is typically carried out in dependence upon a user account. For further explanation, therefore, FIG. 8 sets forth a flow chart illustrating an exemplary method for establishing a user account (210) for the user (100). The method of FIG. 8 includes receiving (504), from the user (100), identifications (506) of a plurality of disparate data sources (228). Identifications (506) of a plurality of disparate data sources (228) may include pathnames, network locations, universal resource locators ('URLs') uniquely identifying the data sources, or any other identifications of data sources that will occur to those of skill in the art.

Receiving (504), from the user (100), identifications (506) of a plurality of disparate data sources (228) may be carried out through the use of user account configuration screens provided by a consolidated content management server and accessible by a user though for example a browser running on a rendering device. Such configuration screens provide a vehicle for efficiently associating with a user account a plurality of disparate data sources.

Figure 8:
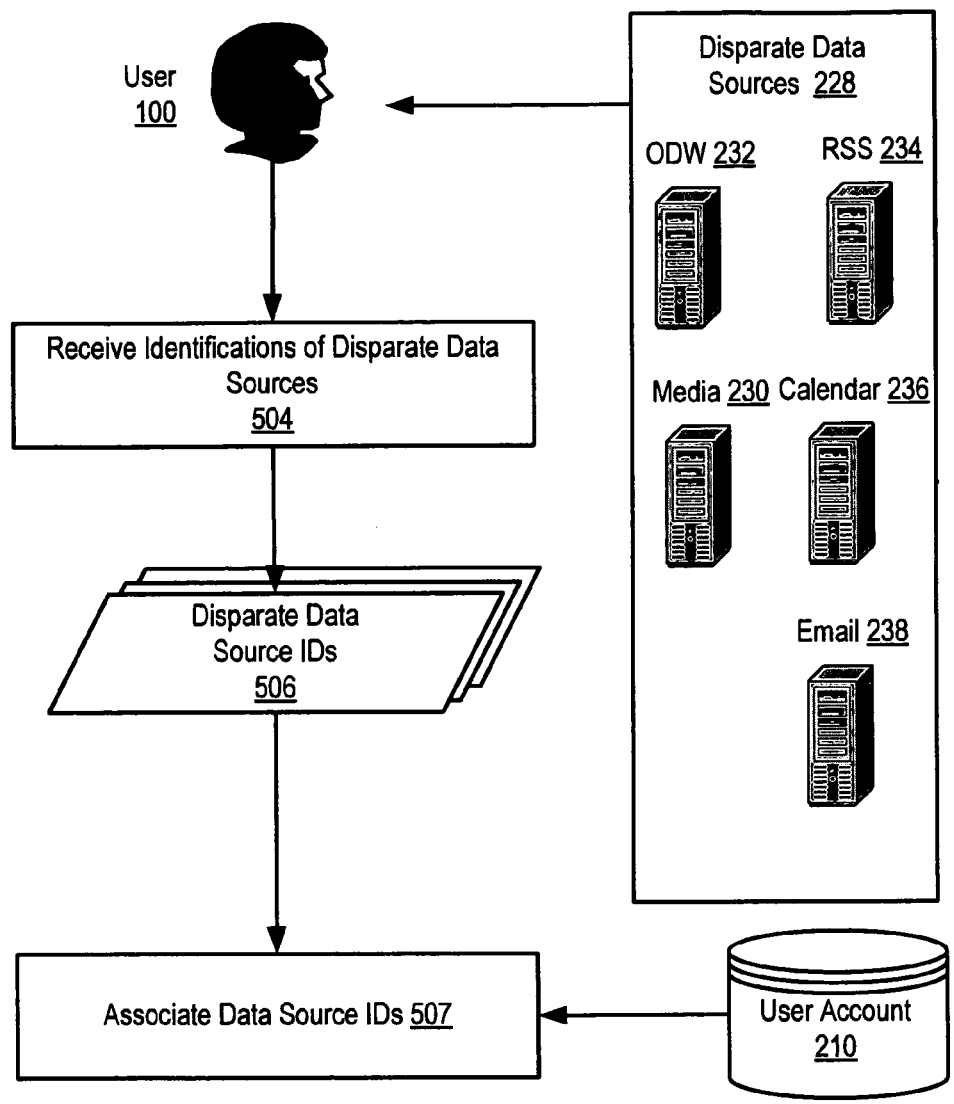
FIG. 8 sets forth a flow chart illustrating an exemplary method for establishing a user account.

The method of FIG. 8 also includes associating (507) the identifications (506) with the user account (210). Associating (507) the identifications (506) with the user account (210) may be carried out by storing the identifications in a user record for the user in association with a user ID uniquely identifying the user.

As discussed above, aggregating content is typically carried out in dependence upon a user account. For further explanation, FIG. 9 sets forth a flow chart illustrating an exemplary method for establishing a user account (210) for the user (100). The method of FIG. 9 includes receiving (514), from a user, identifications (516) of one or more rendering devices (104, 106, and 112). Identifications of rendering devices may include make and model of the rendering device, unique serial numbers of the rendering devices or any other identification of a rendering device that will occur to those of skill in the art.

Receiving (514), from a user, identifications (516) of one or more rendering devices (104, 106, and 112) may be carried out through the use of user account configuration screens provided by a consolidated content management server and accessible by a user though for example a browser running on a rendering device. Such configuration screens provide a vehicle for efficiently associating with a user account one or more rendering devices.

Figure 9:
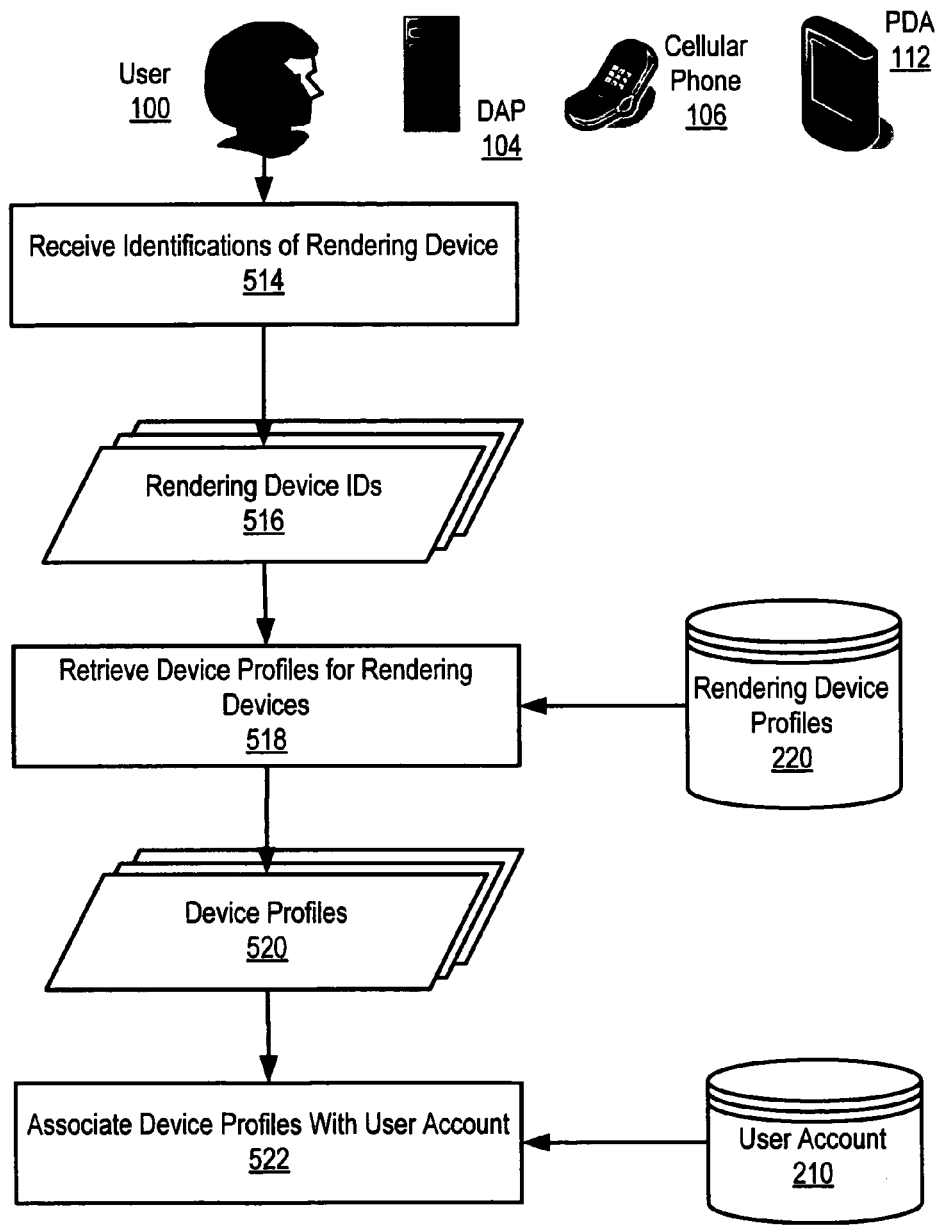
FIG. 9 sets forth a flow chart illustrating an exemplary method for establishing a user account for the user.

The method of FIG. 9 also includes retrieving (518) device profiles (520) for the one or more rendering devices (104, 106, and 112) in dependence upon the identifications (516) and associating (522) the retrieved device profiles (520) with the user account (210). Device profiles (520) for the one or more rendering devices typically identify attributes of the rendering device useful in synthesizing content for rendering on the device and for transmitting the synthesized content to the rendering device. Examples of such attributes in devices profiles include markup languages supported by the device, file types supported by the device, applications capable of being run on the device, communication protocols supported by the device and so on as will occur to those of skill in the art.

Figure 10:
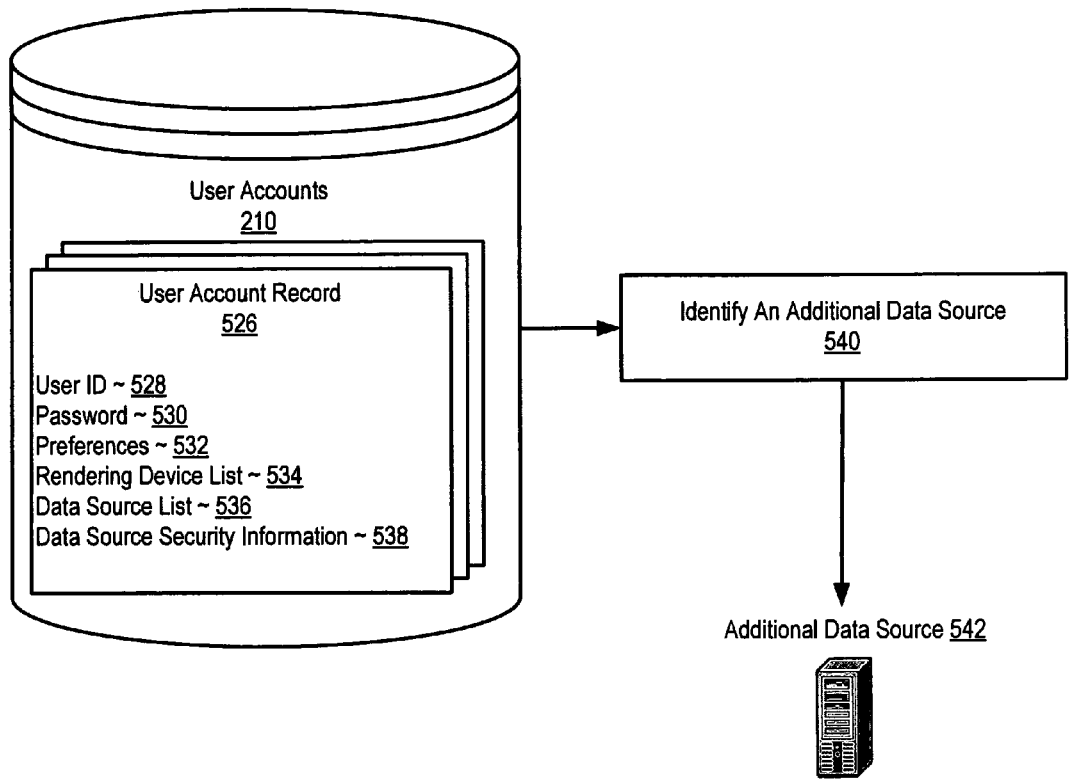
FIG. 10 sets forth block diagram of exemplary user accounts containing a plurality of user account records.

For further explanation, FIG. 10 sets forth block diagram of exemplary user accounts (210) containing a plurality of user account records (526). The exemplary user account records (526) include a user ID (528) uniquely identifying the user and a password (530) for authentication of the user in accessing the user account.

The exemplary user account records (526) include user preferences (532) for synthesizing and rendering the synthesized content for the user. Examples of such user preferences include display preferences, such as font and color preferences, layout preferences, and so on as will occur to those of skill in the art.

The exemplary user account records (526) include a rendering device list (534) including one or more identifications of rendering devices. The exemplary user account records (526) also includes data source list (536) including one or more identifications of disparate data sources and data source security information (538) including any security information required to retrieve content from the identified data source.

The information in use accounts (210) may be used to identify additional data sources without requiring additional user intervention. FIG. 10 therefore also illustrates identifying (540) an additional data source (542) in dependence upon information in the user account. Identifying (540) an additional data source in dependence upon information in the user account information may include identifying an additional data source in dependence upon data sources identified by the user, rendering devices identified by the user, user accounts for one or more other users, data sources identified by one or more other users, and other information in user accounts as will occur to those of skill in the art.

Identifying (540) an additional data source in dependence upon information in the user account information may be carried out by creating a search engine query in dependence upon the information in the user account and querying a search engine with the created query. Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. An example of URL encoded data is:

http://www.example.com/search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

Identifying (540) an additional data source in dependence upon information in the user account information may also include identifying, from the search results returned in the created query, additional sources of data. Such additional sources of data may be identified from the search results by retrieving URLs to data sources from hyperlinks in a search results page returned by the search engine.

Synthesized Content for Single Point Access by a User

As discussed above, consolidated content management provides single point access for content and typically includes synthesizing content of disparate data types into synthesized content of a uniform data type for delivery to a particular rendering device. For further explanation, FIG. 11 sets forth flow chart illustrating an exemplary method for synthesizing content of disparate data types into synthesized content including data of a uniform data type for single point access by a user. The method of FIG. 11 includes identifying (602) aggregated content (404) of disparate data types. Identifying (602) aggregated content (404) of disparate data types for synthesis may be carried out by identifying content stored in association with a user account and aggregated for a user.

Identifying (602) aggregated content (404) of disparate data types typically for synthesis may also be carried out in dependence upon a user instruction. That is, identifying (602) aggregated content (404) of disparate data types for synthesis may include receiving a user instruction identifying aggregated content for synthesis and selecting for synthesis the content identified in the user instruction.

Figure 11:
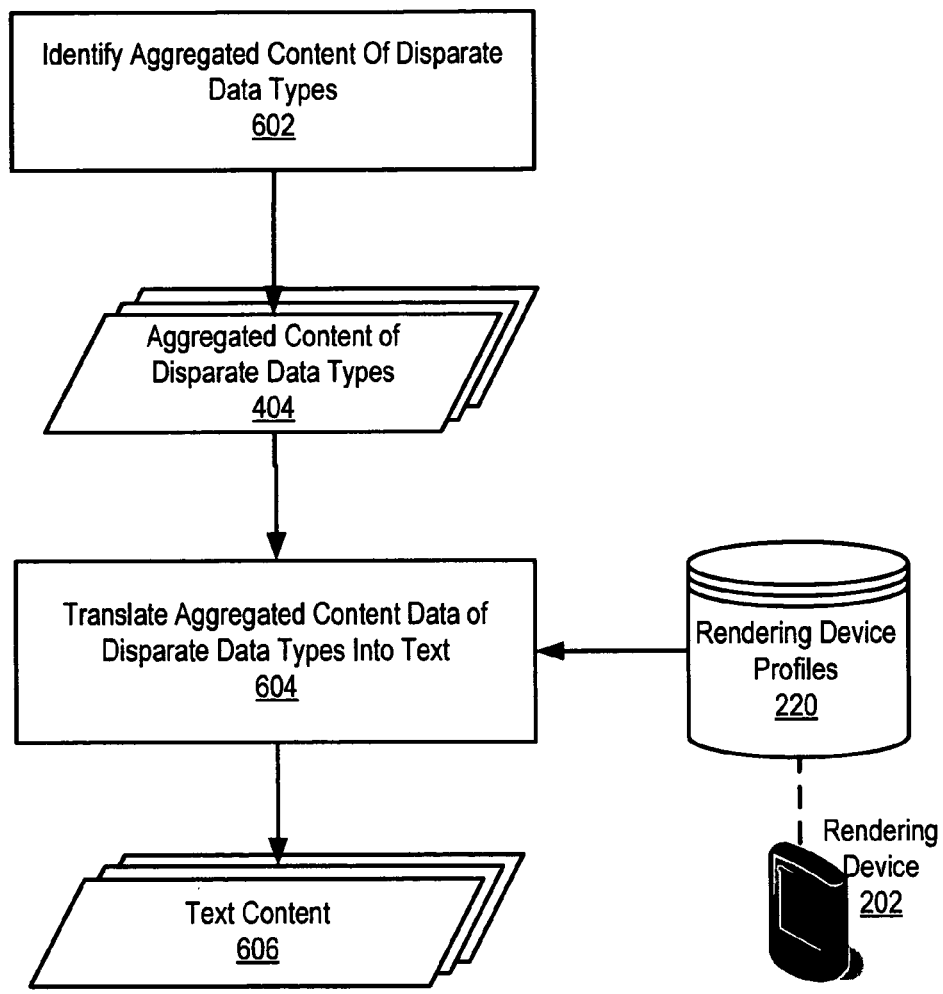
FIG. 11 sets forth flow chart illustrating an exemplary method for synthesizing content of disparate data types into synthesized content including data of a uniform data type for single point access by a user.

The method of FIG. 11 also includes translating (604) the aggregated content (404) into text content (606) in accordance with device profiles (220) for an identified rendering device (202). Translating the aggregated content into text content in accordance with device profiles for an identified rendering device may be carried out by identifying a markup language supported by the rendering device and creating text and markup for the aggregated content in accordance with the identified markup language as discussed below with reference to FIGS. 12 and 13. Translating (604) the aggregated content (404) into text content in accordance with device profiles (220) for an identified rendering (202) device may also be carried out by creating text in dependence upon the aggregated content; creating a media file for the text content; and inserting the text in the media file as discussed below with reference to FIG. 15.

As discussed above, translating into text content may include creating text and markup for the aggregated content in accordance with an identified markup language. For further explanation, therefore, FIG. 12 sets forth a flow chart illustrating an exemplary method for translating the aggregated content into text content in accordance with device profiles for an identified rendering device that includes identifying (608) a markup language (610) supported by the rendering device (202). Identifying (608) a markup language (610) supported by the rendering device (202) may be carried out by retrieving a rendering device profile (220) for the rendering device and selecting a markup language supported by the rendering device from the selected device profile. Examples of markup languages useful in synthesizing aggregated content include X+V, Wireless Markup Language ('WML'), eXtensible Markup Language ('XML'), hypertext transfer markup language ('HTML') and others as will occur to those of skill in the art.

Figure 12:
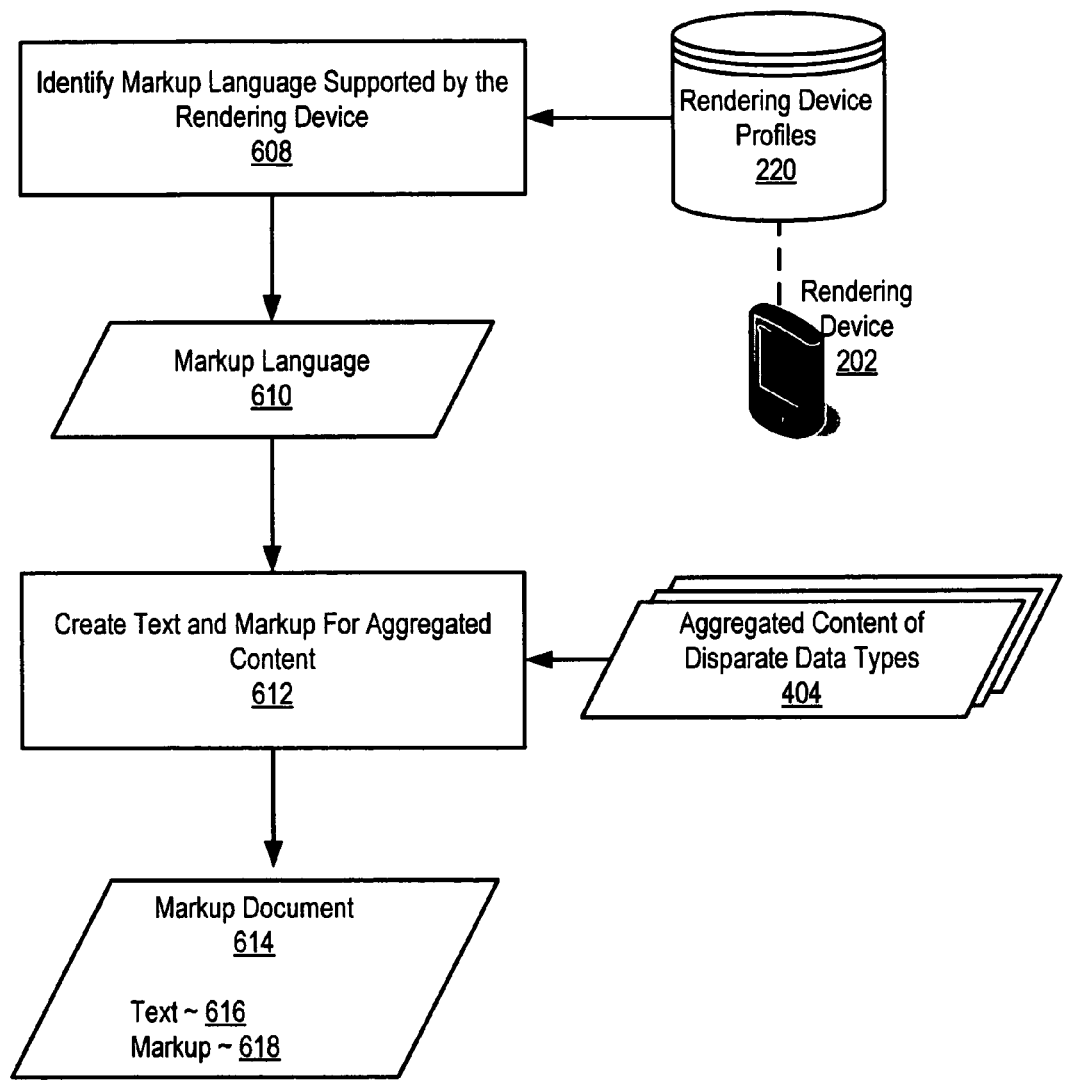
FIG. 12 sets forth a flow chart illustrating an exemplary method for translating the aggregated content into text content in accordance with device profiles for an identified rendering device.

The method of FIG. 12 also includes creating (612) text (616) and markup (618) for the aggregated content (404) in accordance with the identified markup language (610). In the example of FIG. 12, the text (616) and markup (618) make up a markup document (614). Creating (612) text (616) and markup (618) for the aggregated content (404) in accordance with the identified markup language (610) includes representing in text and markup the aggregated content such that a browser supporting the selected markup language capable of rendering some or all of the content contained in the aggregated data prior to being synthesized.

Creating (612) text (616) and markup (618) for the aggregated content (404) in accordance with the identified markup language (610) such that a browser capable of rendering the text and markup may render from the translated content the some or all of the aggregated content prior to being synthesized may include augmenting the content during translation in some way. That is, translating aggregated content into text and markup may result in some modification to the original aggregated content or may result in deletion of some content that cannot be accurately translated. The quantity of such modification and deletion will vary according to the type of data being translated as well as other factors as will occur to those of skill in the art.

Consider for further explanation the following markup language depiction of a snippet of audio clip describing the president.

```
<head> original file type= 'MP3' keyword = 'president' number = '50',
keyword = 'air force' number = '1' keyword = 'white house'
number ='2' >
</head>
    <content>
        Some content about the president
    </content>
```

In the example above, an MP3 audio file is translated into text and markup. The header in the example above identifies the translated data as having been translated from an MP3 audio file. The exemplary header also includes keywords included in the content of the translated document and the frequency with which those keywords appear. The exemplary translated data also includes content identified as 'some content about the president.'

As discussed above, one useful markup language for synthesizing content is XHTML plus Voice. XHTML plus Voice ('X+V') is a Web markup language for developing multimodal applications, by enabling speech navigation and interaction through voice markup. X+V provides speech-based interaction in devices using both voice and visual elements. Speech enabling the synthesized data for consolidated content management according to embodiments of the present invention is typically carried out by creating grammar sets for the text of the synthesized content. A grammar is a set of words that may be spoken, patterns in which those words may be spoken, or other language elements that define the speech recognized by a speech recognition engine in a multimodal browser. Such speech recognition engines are useful in rendering synthesized data to provide users with voice navigation of and voice interaction with synthesized content.

As discussed above, synthesized content may be speech enabled. For further explanation, therefore, FIG. 13 sets forth an exemplary method synthesizing content of disparate data types into synthesized content including data of a uniform data type single point access by a user that includes dynamically creating (626) grammar sets (628) for the text content (606). As discussed above, a grammar is a set of words that may be spoken, patterns in which those words may be spoken, or other language elements that define the speech recognized by a speech recognition engine in a multimodal browser or other rendering application supported by a rendering device.

Dynamically creating grammar sets (628) for the text content (606) may be carried out by identifying (630) keywords (632) for the text content (606). Identifying (630) keywords (632) for the text content (606) may include identifying keywords in the text content (606) determinative of content or logical structure and including the identified keywords in a grammar associated with the text content. Keywords determinative of content are words and phrases defining the topics of the synthesized content and the information presented the synthesized content. Keywords determinative of logical structure are keywords that suggest the form in which information of the synthesized content is presented. Examples of logical structure include typographic structure, hierarchical structure, relational structure, and other logical structures as will occur to those of skill in the art.

Identifying keywords in the text determinative of content may be carried out by searching the translated text for words that occur in the text more often than some predefined threshold. The frequency of the word exceeding the threshold indicates that the word is related to the content of the translated text because the predetermined threshold is established as a frequency of use not expected to occur by chance alone. Alternatively, a threshold may also be established as a function rather than a static value. In such cases, the threshold value for frequency of a word in the translated text may be established dynamically by use of a statistical test which compares the word frequencies in the translated text with expected frequencies derived statistically from a much larger corpus. Such a larger corpus acts as a reference for general language use.

Identifying keywords in the translated text determinative of logical structure may be carried out by searching the translated text for predefined words determinative of structure. Examples of such words determinative of logical structure include 'introduction,' 'table of contents,' 'chapter,' 'stanza,' 'index,' and many others as will occur to those of skill in the art.

Dynamically creating (626) grammar sets (628) for the text content (606) may also be carried out by creating (634) grammars (628) in dependence upon the keywords (632) and grammar creation rules (636). Grammar creation rules are a pre-defined set of instructions and grammar form for the production of grammars. Creating grammars in dependence upon the identified keywords and grammar creation rules may be carried out by use of scripting frameworks such as JavaServer Pages, Active Server Pages, PHP, Perl, XML from translated data. Such dynamically created grammars may be stored externally and referenced, in for example, X+V the <grammar src=""/> tag that is used to reference external grammars.

Figure 13:
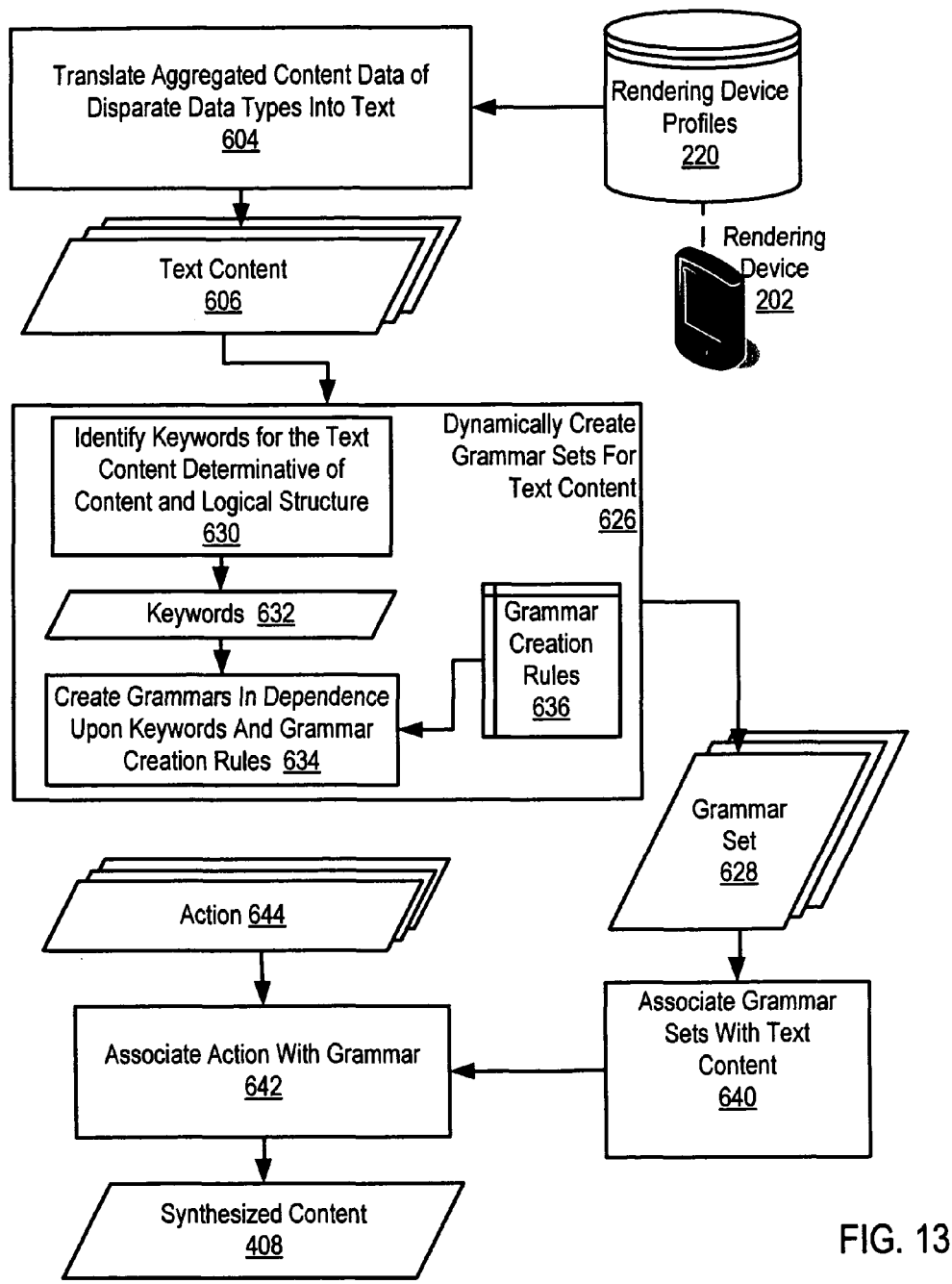
FIG. 13 sets forth a flow chart illustrating an exemplary method for creating text and markup for the aggregated content in accordance with the identified markup language.
Figure 14:
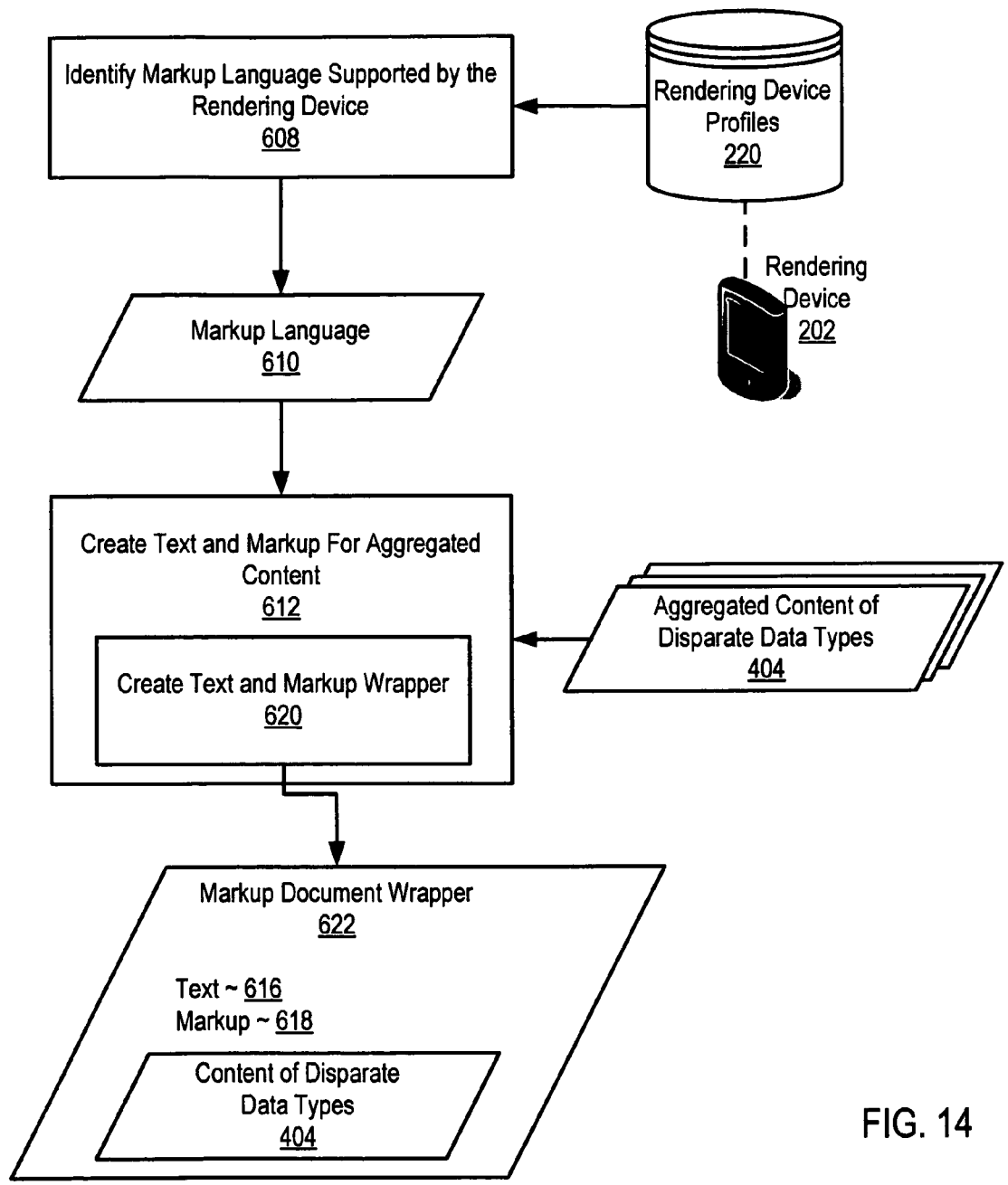
FIG. 14 sets forth a flow chart illustrating an exemplary method synthesizing content of disparate data types into synthesized content including data of a uniform data type single point access by a user that includes dynamically creating grammar sets for the text content.

The method of FIG. 13 also includes associating (640) the grammar sets (628) with the text content (606). Associating the grammar sets with the text content includes inserting markup in a markup document containing the translated text. Inserting markup in the markup document containing the translate text may be carried out by creating markup defining the dynamically created grammar sets inserting the created markup into a markup document.

The method of FIG. 13 also includes associating (642) one or more actions (644) with the grammar sets (628). An action is a set of computer instructions that when executed carry out a predefined task. Associating an action with the grammar sets thereby provides for voice initiation of the action such that the associated action is invoked in response to the recognition of one or more words or phrases of the grammar sets.

In examples above, synthesis of the aggregated content results in the replacement of the original aggregated content with synthesized content. This is for explanation, and not for limitation. In fact, in some cases some or all of the original aggregated content is preserved. Creating text and markup for the aggregated content in accordance with the identified markup language may also be carried out by preserving the data type of the aggregated content and also creating a markup document for presentation of the content in a rendering device and for invoking the rendering of the content in the rendering device. For further explanation, therefore, FIG. 14 sets forth a flow chart illustrating an exemplary method for creating (612) text (616) and markup (618) for the aggregated content (404) in accordance with the identified markup language (610) that includes creating (620) a wrapper (622) for invoking the aggregated content (404) on the rendering device (202). The wrapper (622) for invoking the aggregated content (404) on the rendering device (202) is typically a markup document created in a markup language supported by the rendering device for presentation of the presence of the content on the rendering device and for invoking the rendering of the content on the rendering device.

Some useful rendering devices do not support browsers for rendering markup documents. For example, some digital audio players play media files, such as MP3 files but have no browser. For further explanation, therefore, FIG. 15 sets forth a flow chart illustrating an exemplary method for translating (604) the aggregated content (404) into text content in accordance with device profiles (220) for an identified rendering (202) device that does not rely on a device supporting a browser to render a markup document. The method of FIG. 15 includes creating (646) text (648) in dependence upon the aggregated content (404). Creating (646) text (648) in dependence upon the aggregated content (404) typically includes extracting or inferring text content from the aggregated data for rendering on the rendering device. For example, the text of an email may be extracted from an email message for rendering on a digital audio player.

Figure 15:
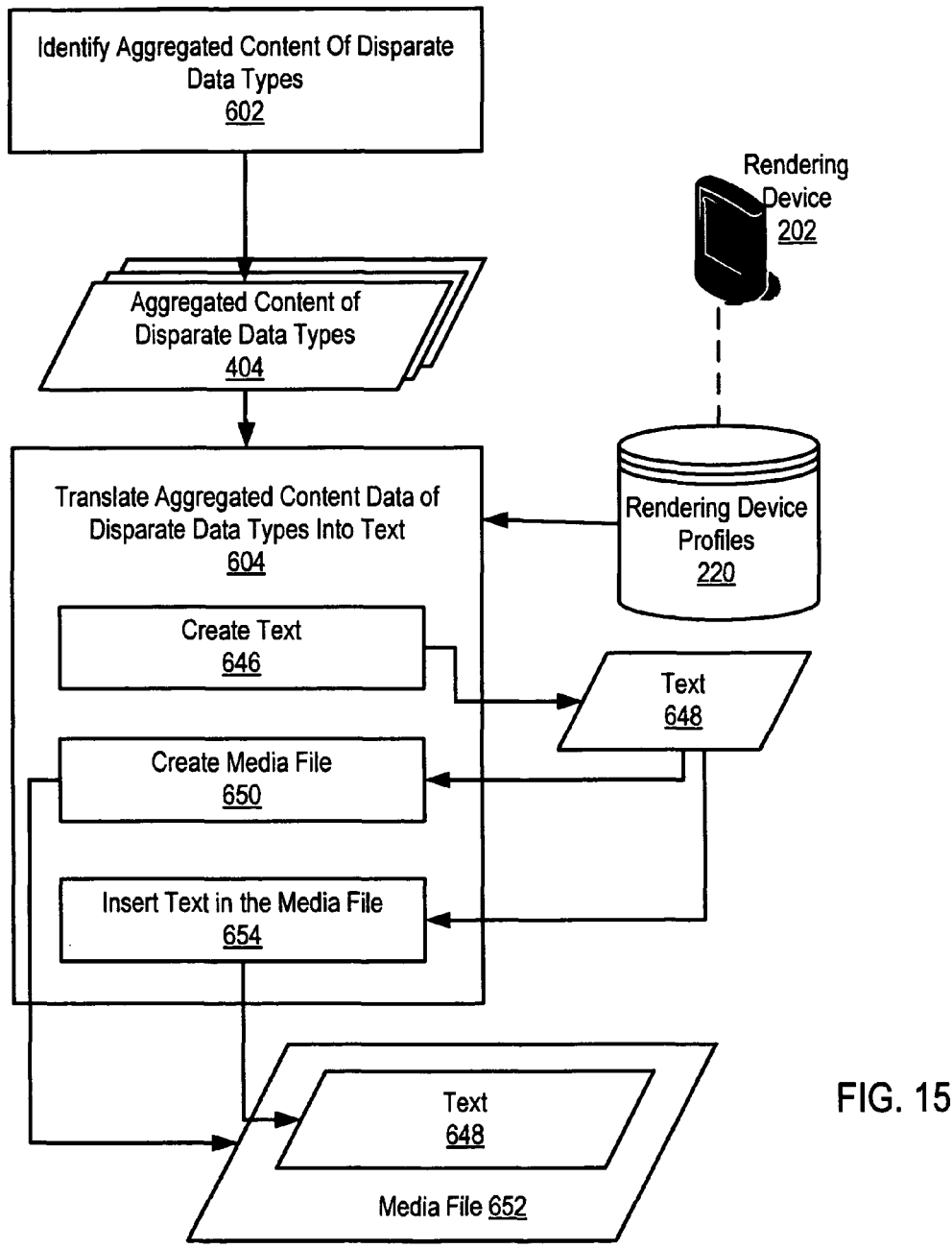
FIG. 15 sets forth a flow chart illustrating an exemplary method for translating the aggregated content into text content in accordance with device profiles for an identified rendering device.

The method of FIG. 15 also includes creating (650) a media file (652) for the text content (648). Examples of media files include MP3 files, wav files, and others that will occur to those of skill in the art.

The method of FIG. 15 also includes inserting (654) the text (648) in the media file (652). Media files such as, for example, MP3 files support header fields capable of storing the created text. Inserting (654) the text (648) in the media file (652) advantageously allows a media player such as a digital audio player to render content synthesized from other data types such as email content, calendar content, RSS content, and other content as will occur to those of skill in the art.

Publishing Synthesized Content Through RSS Feeds

Figure 16:
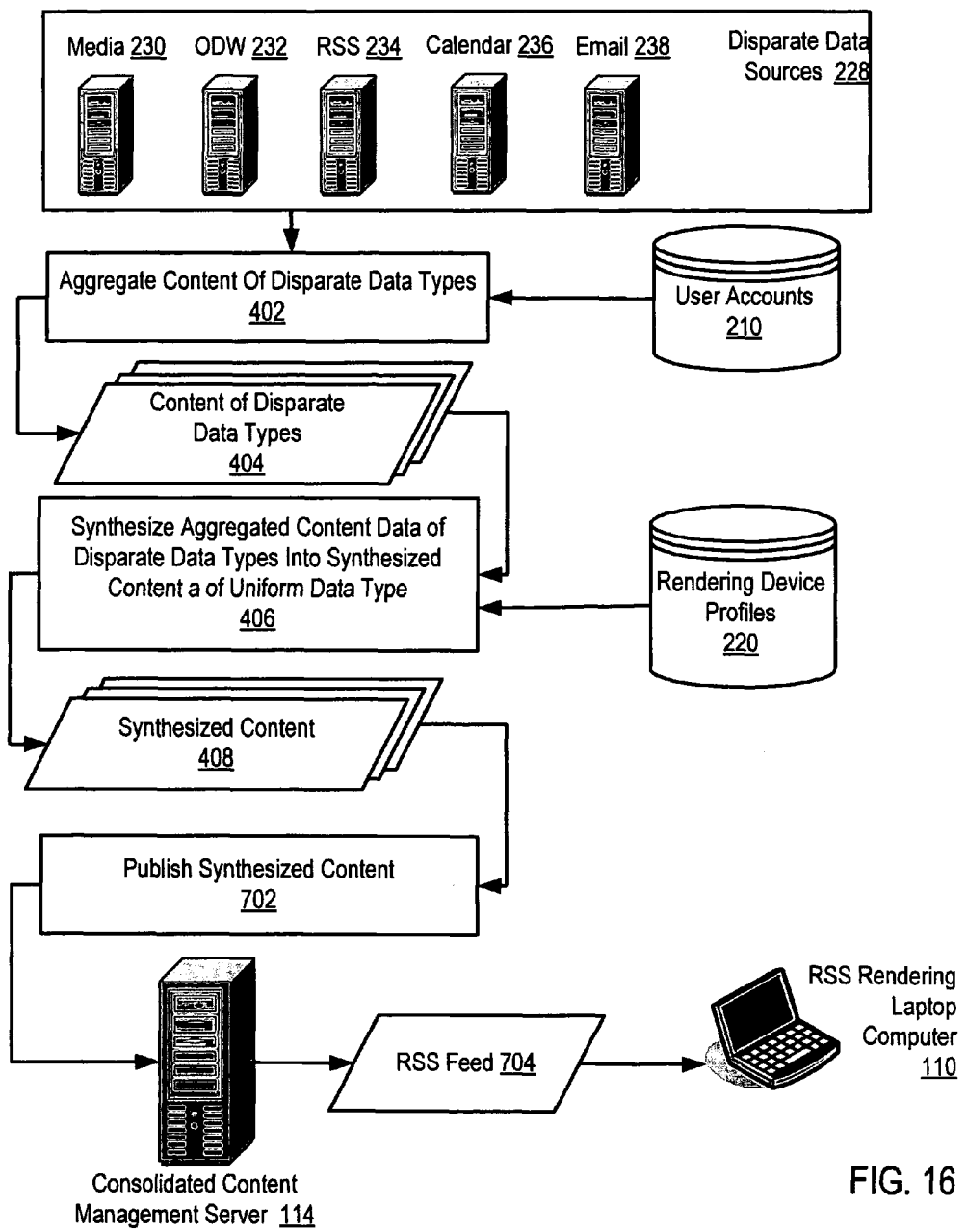
FIG. 16 sets forth a flow chart illustrating a computer-implemented method for publishing content.

Consolidated content management provides a single point of access for content aggregated and synthesized for a user. Such content may also advantageously be published. For further explanation, FIG. 16 sets forth a flow chart illustrating an exemplary computer-implemented method for publishing content. The method of FIG. 16 includes aggregating (402), for a user, content (404) of disparate data types from disparate data sources (228). Aggregating (402), for a user, content (404) of disparate data types from disparate data sources (228) according to the method of FIG. 16 is carried out in dependence upon user accounts (210) established for a user that contain identifications of user selected data sources for aggregation and identifications of one or more rendering devices upon which synthesized content is to be rendered. Aggregating, for a user, content of disparate data types from disparate data sources may be carried out by establishing a user account for the user; retrieving content of disparate data types from identified disparate data sources associated with the user account; storing the retrieved content; and associating the stored content with the user account as discussed in more detail above with reference to FIGS. 7-10.

The method of FIG. 16 also includes synthesizing (406) the aggregated content (404) of disparate data types into synthesized content (408) including data of a uniform data type for delivery to a particular RSS rendering device (110). Synthesized content is content derived from aggregated data which has been synthesized for rendering upon a particular rendering device. That is, the content of the aggregated data is synthesized into data of a data type that a particular rendering device supports.

Synthesizing aggregated content of disparate data types into synthesized content including data of a uniform data type for delivery to a particular RSS rendering device is typically carried out in dependence upon device profiles (220) for the RSS rendering device identifying attributes of the particular rendering device such a file formats the RSS rendering device supports, markup languages the RSS rendering device supports, data communications protocols the RSS rendering device supports and other attributes as will occur to those of skill in the art as discussed above with reference to FIG. 11-14.

The method of FIG. 16 also includes publishing (702) the synthesized content (408) through an RSS feed (704). An RSS feed is typically implemented as one or more XML files containing summaries of web content accompanied by links to more extensive versions of the content at a RSS content source, as well as other meta-data. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). RSS is a format often used for syndicating news and the content of news-like sites, including major news sites, news-oriented community sites, and personal weblogs. RSS allows users to see some of a web site's content, in the form of items which are created from the website's associated RSS feed, without requiring the user to visit the web site directly. If the user would like to view the full content of the item, the user may activate a link to browse the website featuring the full content of the channel or item.

As discussed above, an RSS feed is typically implemented as one or more XML files containing links to more extensive versions of content. For further explanation, FIG. 17 sets forth a flow chart illustrating an exemplary method for publishing the synthesized content through an RSS feed. The method of FIG. 17 includes establishing (706) one or more hyperlinks (708) to the synthesized content, inserting (710) in an RSS feed (704) the one or more hyperlinks (708) and associating (714) in the RSS feed (704) with each hyperlink (708) metadata (712) describing the synthesized content accessible through the hyperlink (708). Metadata (712) describing the synthesized content accessible through the hyperlink (708) often includes summaries of the synthesized content accessible through the hyperlink such that a user may be informed of the synthesized content accessible through the hyperlink.

The hyperlinks and associated metadata may provide an RSS channel to synthesized content. An RSS channel is typically a container for an arbitrary number of items of a similar type, having some relationship which is defined by the context of the container. An RSS channel to synthesized content may be a reverse-chronological sorted list of links to synthesized content, along with metadata describing aspects the synthesized content story often indicating the title of content and a description of the content.

Each RSS channel is designated by markup in the RSS feed's XML files and has required sub-elements which are also designated by markup. Required sub-elements of an RSS channel typically include a title to name the RSS channel, a link, and a description. The link is the URL of the synthesized content typically implemented as a web page, such as, for example, a web page written in HTML. Each RSS channel may also contain optional sub-elements. Optional sub-elements of an RSS channel include, for example, an image sub-element, which provides for an image to be displayed in connection with the RSS channel.

Figure 17:
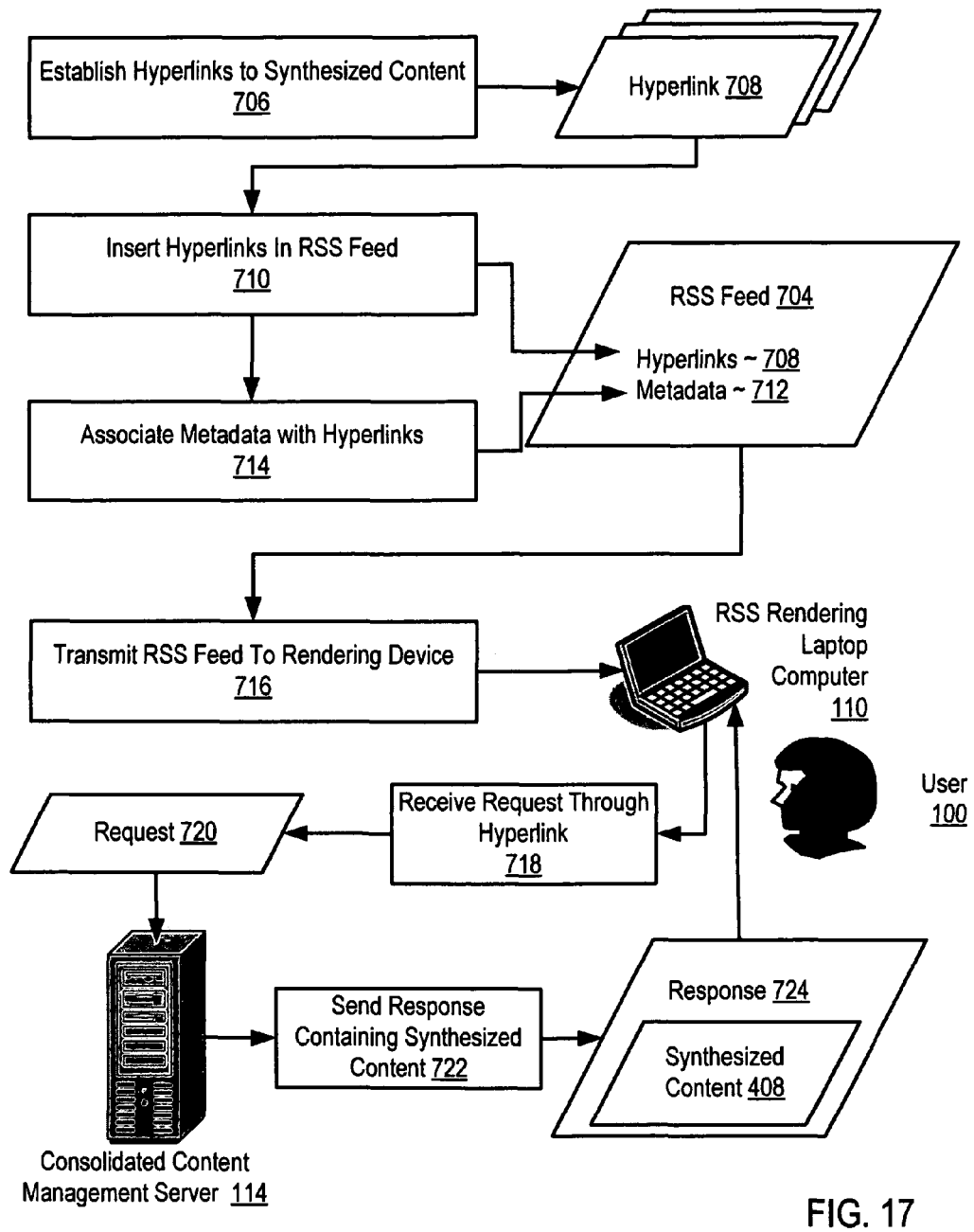
FIG. 17 sets forth a flow chart illustrating an exemplary method for publishing the synthesized content through an RSS feed.

The method of FIG. 17 also includes transmitting (716) the RSS feed (704) to a rendering device (110). Transmitting (716) the RSS feed (704) to a rendering device (110) may be carried out by selecting a data communications protocol supported by the RSS rendering device (110) and sending the RSS feed to the RSS rendering device according to the selected data communications protocol.

The method of FIG. 17 also includes receiving (718) a request (720) for the synthesized content through an invocation of a hyperlink (708) in the RSS feed (704). A user may invoke a hyperlink in the RSS feed through, for example, a mouse or keystroke.

The method of FIG. 17 also includes sending (722) to the rendering device (110), in response to the request (720), a response (724) containing the synthesized content (408). Sending (722) to the rendering device (110), in response to the request (720), a response (724) containing the synthesized content (408) provide to a user synthesized content for rendering on the RSS rendering device.

Invoking Content Management Directives

Consolidated content management servers usefully provide a single point of access for a wide variety of content available in many different data types. Such a consolidated content management server may also perform content management directives on the content managed by the server. Content management directives are software actions performed on synthesized content managed by the content management server. Examples of content management directives include deleting content, retrieving additional content, forwarding content, highlighting content, and many others as will occur to those of skill in the art. Such content management directives provide users increased control over the management of the wide variety of content accessible through the consolidated content management server.

As discussed above, content may be synthesized and stored in a media file for delivery to a digital audio player. Media files and digital audio players of many types support a user specified rating for the content. For example, the iPod® digital audio player and the iTunes® digital audio player application available from Apple® support a five-star rating system that provides assigning to content one of five ratings: one star, two stars, three stars, four stars, or five stars. Such ratings assigned to content in a media file may be used to communicate content management directives from a user to a consolidated content management server. For further explanation, therefore, FIG. 18 sets forth a flow chart illustrating an exemplary method for invoking content management directives on a consolidated content management server. The method of FIG. 18 includes synthesizing (804) content of disparate data types into synthesized content in a media file (810) for delivery to a particular digital audio player (104). Synthesizing (804) content of disparate data types into synthesized content in a media file (810) for delivery to a particular digital audio player (104) may be carried out by retrieving content, extracting text from the retrieved content, creating a media file and storing the extracted text as metadata associated with the media file. Such content synthesized for delivery to a digital audio player may be synthesized from a variety of native data formats. Such content may be email content, calendar data, RSS content, text content in word processing documents, or any other content that will occur to those of skill in the art.

One specific example of synthesizing (804) content of disparate data types into synthesized content in a media file (810) for delivery to a particular digital audio player (104) includes synthesizing email content. Synthesizing (804) email content may be carried out by retrieving an email message; extracting text from the email message; creating a media file; and storing the extracted text of the email message as metadata associated with the media file as discussed below with reference to FIGS. 21 and 22.

Another specific example of synthesizing (804) content of disparate data types into synthesized content in a media file (810) for delivery to a particular digital audio player (104) includes synthesizing RSS content. Synthesizing (804) RSS content into synthesized content in a media file (810) for delivery to a particular digital audio player (104) may be carried out by retrieving, through an RSS feed, RSS content; extracting text from the RSS content; creating a media file; and storing the extracted text of the RSS content as metadata associated with the media file as discussed below with reference to FIGS. 23 and 24.

Figure 18:
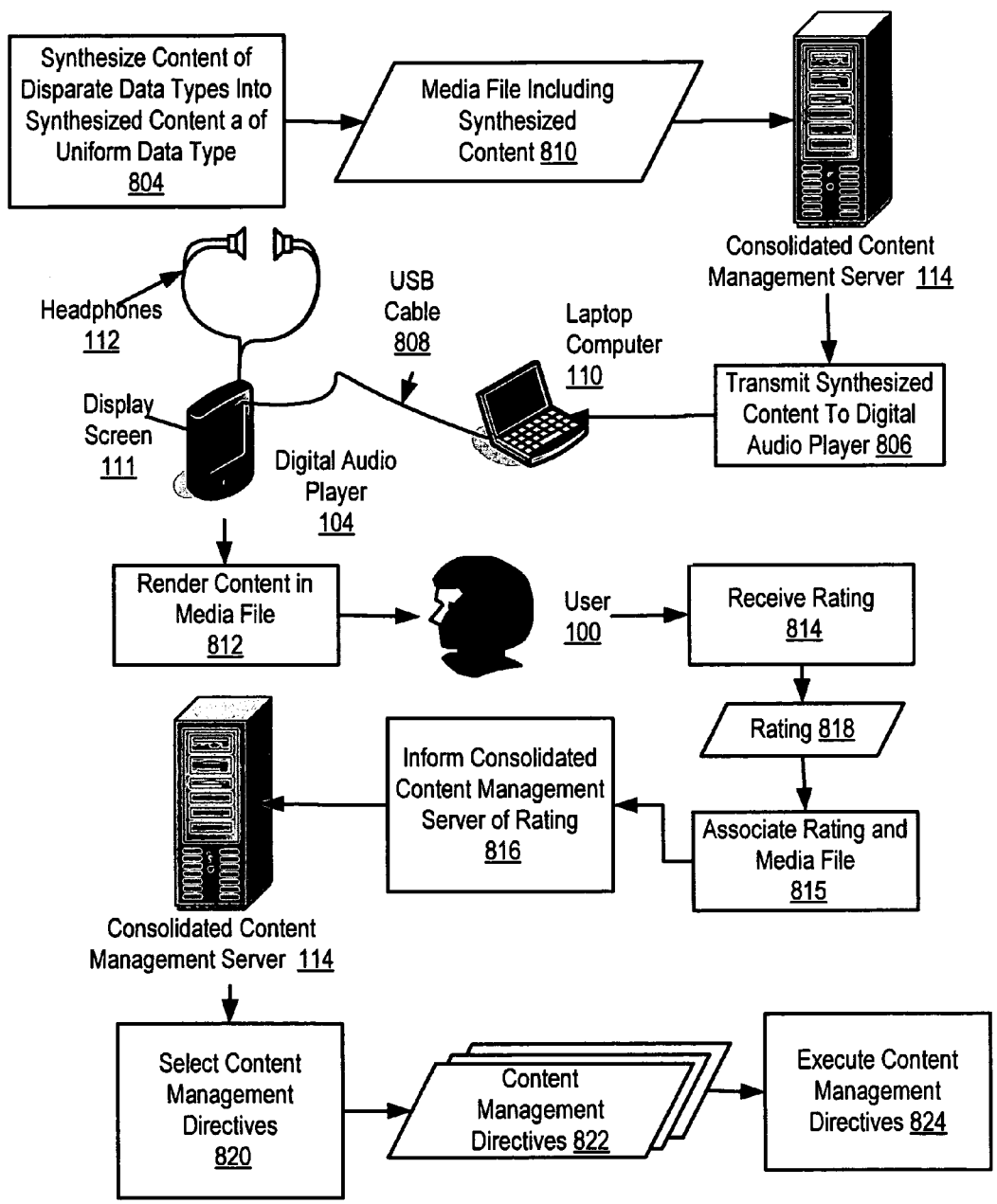
FIG. 18 sets forth a flow chart illustrating an exemplary method for invoking content management directives on a consolidated content management server.

The method of FIG. 18 includes transmitting (806) the synthesized content (810) to the digital audio player (104). Transmitting (806) the synthesized content (810) to the digital audio player (104) may be carried out by downloading the media file (810) to a digital audio player application on a client computer, such as the laptop computer (110) of FIG. 18 and the storing the media file (810) on the digital audio player (104).

A digital media player application is an application that manages media content such as audio files and video files. Such digital media player applications are typically capable of transferring media files to a digital audio player. Examples of digital media player applications include Music Match™, iTunes®, and others as will occur to those of skill in the art.

The method of FIG. 18 includes rendering (812) the content in the media file (810) on the digital audio player (104). The synthesized content may be visually rendered on a display screen of a digital audio player or may be converted to text and rendered as audio.

The method of FIG. 18 also includes receiving (814), from a user (100) in response to rendering the content, a rating (818) for the content. Receiving (814), from a user (100) in response to rendering the content, a rating (818) for the content may be carried out by receiving a selection of a rating through a digital audio player that supports rating system. For example, the iPod® digital audio player and the iTunes® digital audio player application available from Apple® support a five-star rating system that provides assigning to content one of five ratings: one star, two stars, three stars, four stars, or five stars. The iPod® digital audio player supports receiving from a user a rating selection and associating that received rating selection with content contained in a media file on the iPod®.

A rating received from a user may also be user defined. .mp4 files support flexible ID3v2 tags and therefore a user defined rating scheme may be used to configure many different ratings for an .mp4 file.

The method of FIG. 18 also includes associating (815) the rating (818) with the content in the media file (810). Associating the associating the rating with the content in the media file may be carried out by embedding the rating in the media file. For further explanation, FIG. 19 sets forth a block diagram of an MPEG file (874) such as an .mp4 file. The MPEG file of FIG. 19 includes an audio portion (882) of the media file. The audio portion of the MPEG file includes the binary audio data.

Figure 19:
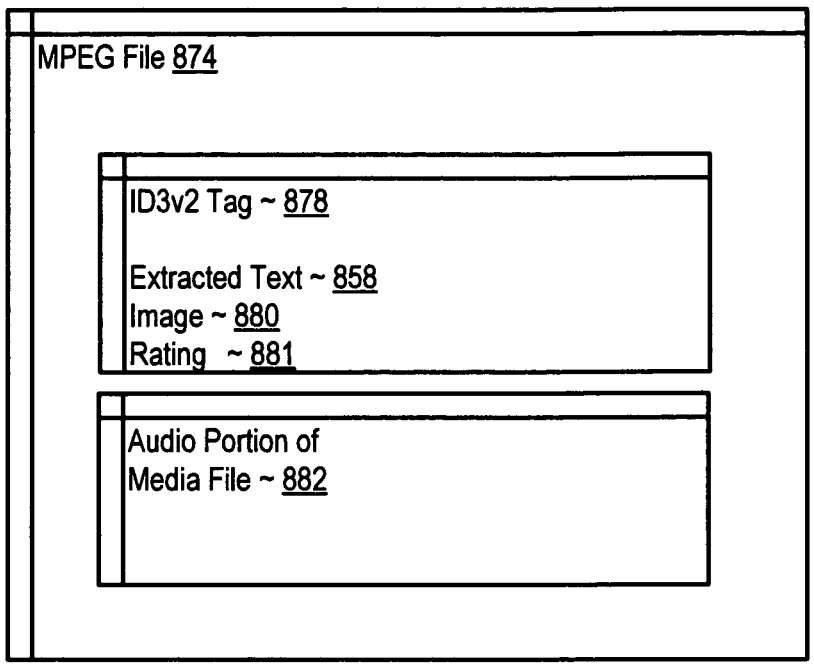
FIG. 19 sets forth a block diagram of an MPEG file such as an .mp4 file.

The MPEG file (874) of FIG. 19 has an ID3v2 tag (878) prepended to the audio portion (882) of the file that contains synthesized content such as extracted email text or extracted RSS text (858) and an image (880) such as an image extracted from an attachment of the email or an image extracted from RSS content. The ID3v2 tag of FIG. 19 also includes a rating (881) assigned to the synthesized content stored in the MPEG file (874). An ID3v2 tag provides a container for metadata associated with the media file. An ID3v2 tag includes one or more fames supporting the inclusion of text, images, files, and other information. ID3v2 tags are flexible and expandable because parsers that do not support specific functions of the an ID3v2 tag will ignore the unsupported functions. ID3v2 supports Unicode thereby providing the ability to include synthesized content in text of many different languages. The maximum tag size of an ID3v2 tag is typically 256 megabytes and maximum frame size is typically 16 megabytes.

Figure 20:
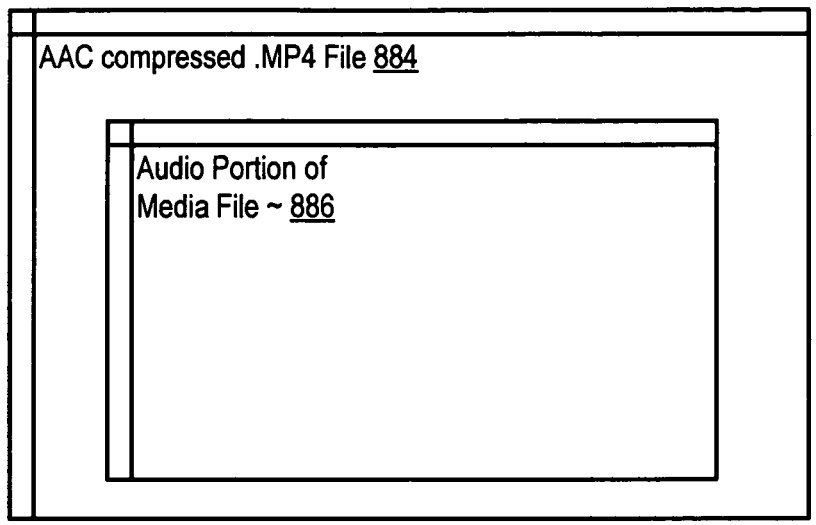
FIG. 20 sets forth a block diagram of an AAC compressed .mp4 file such as those supported by the iTunes digital audio player application and played on an ipod digital audio player.
Figure 20:
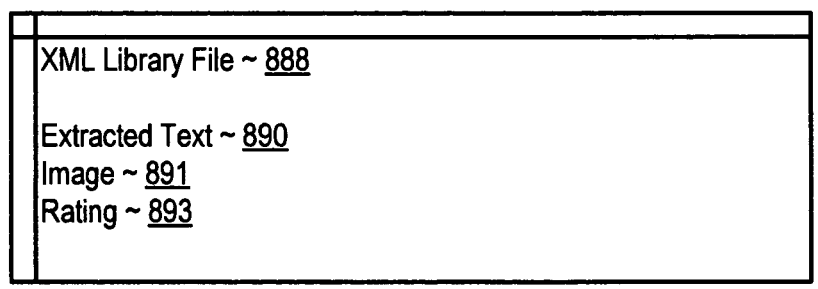

In the example of FIG. 19, a rating is stored in the media file itself. Associating the rating with the content in the media file may be alternatively carried out by including the rating in a metadata file associated with the media file. For further explanation, therefore, FIG. 20 sets forth a block diagram of an AAC compressed .mp4 file (884) such as those supported by the iTunes digital audio player application and played on an iPod digital audio player. In the example of FIG. 20 the AAC compressed .mp4 file has included in the file the binary audio portion (886) of the digital media file. The AAC compressed .mp4 file (884) of FIG. 20 also has an associated metadata file implemented as an eXtenxible markup language ('XML') library file (888) that includes the synthesized content as extracted text (890) from content of disparate data types and includes the rating (893) of the content. iTunes digital audio player application includes a single iTunes library file that contains metadata describing the contents of the media files comprising the iTunes library. The iTunes library file is implemented as an XML file, the format of which is defined by a flexible Document Type Definition ('DTD').

Returning to the example of FIG. 18: After associating (815) the rating (818) with the content in the media file (810), the method of FIG. 18 continues by informing (816) the consolidated content management server (114) of the rating (818) associated with the content in the media file (815). Informing (816) the consolidated content management server (114) of the rating (818) associated with the content in the media file (815) may be carried out by sending an identification of the synthesized content to a consolidated content management server; and sending the rating associated with the content to a consolidated content management server. The identification of the content may be the media file itself and the rating associated with the content may be stored in the media file. In such cases, informing (816) the consolidated content management server (114) of the rating (818) associated with the content in the media file (815) may be carried out by sending the media file containing the content and the associated rating to the consolidated content management server.

As discussed above, the rating may be associated with the content through a metadata file, such as an XML file. In such cases, informing (816) the consolidated content management server (114) of the rating (818) associated with the content in the media file (815) may be carried out by sending the metadata file to the consolidated content management server.

The method of FIG. 18 also includes selecting (820) in dependence upon the rating (818) one or more content management directives (822) and executing (824) the content management directives (822). Selecting in dependence upon the rating one or more content management directives may be carried out by retrieving a directive ID in dependence upon the rating of the content and metadata describing the content. Such a selection may also be carried out in dependence upon a content management directive selection rule. Consider for example the following content management directive selection rule:

IF content ID=typeEmail
AND rating=1 star
THEN content management directive ID=delteEmail( ).

In the exemplary content management selection rule above, if the content ID of content synthesized in a media file for delivery to a digital audio player is identified as email content and if a user has associated with the content a one-star rating with the email content, then the content management selection rule above dictates that a software algorithm named 'deleteEmail( )' is to be executed. Executing 'deleteEmail( )' in the example above deletes identified email messages.

Executing (824) the content management directives (822) results in administration of the synthesized content managed by the consolidated content management server. Executing (824) the content management directives (822) may include retrieving additional content in dependence upon the rating, deleting identified synthesized content in dependence upon the rating, highlighting identified content in dependence upon the rating, and many others as will occur to those of skill in the art.

Ratings advantageously provide a mechanism for invoking content management directives on a consolidated content server without requiring modification of a digital audio player upon which the content under management is rendered. Such content management directives provide increased flexibility in consolidated content management according to embodiments of the present invention.

Figure 21:
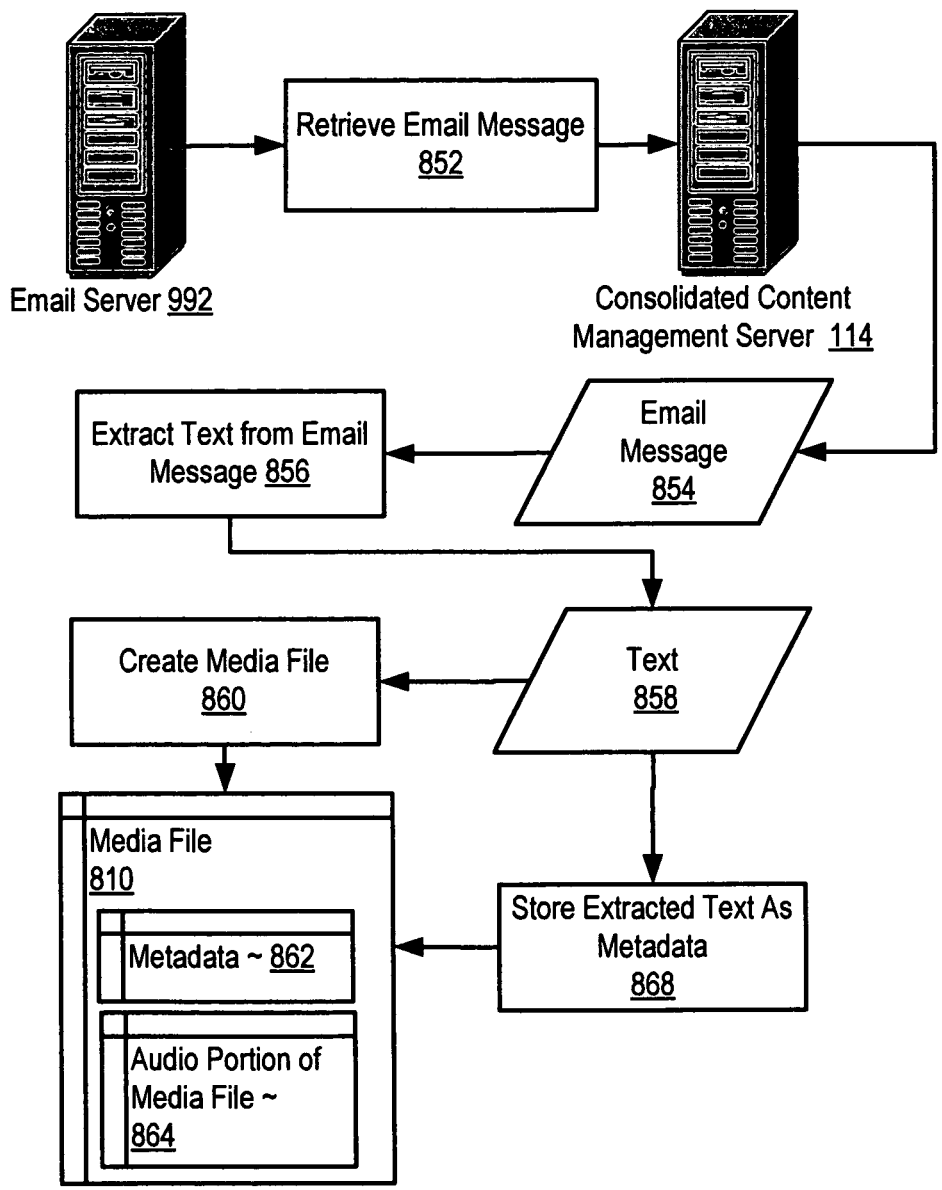
FIG. 21 sets forth a flow chart illustrating an exemplary method for synthesizing email content into synthesized content in a media file for delivery to a particular digital audio player for visually presenting the email content on a display screen of the digital audio player FIG. 22 sets forth another flow chart illustrating an exemplary method for synthesizing email content into synthesized content in a media file for delivery to a particular digital audio player for audio rendering of some or all of the the email.

As discussed above, synthesizing content of disparate data types into synthesized content in a media file for delivery to a particular digital audio player may be carried out by retrieving content, extracting text from the retrieved content, creating a media file, and storing the extracted text as metadata associated with the media file. Such content synthesized for delivery to a digital audio player may be synthesized from a variety of native data formats such as email content, calendar data, RSS content, text content in word processing documents, and so on. For further explanation, FIG. 21 sets forth a flow chart illustrating an exemplary method for synthesizing email content into synthesized content in a media file for delivery to a particular digital audio player for visually presenting the email content on a display screen of the digital audio player The method of FIG. 21 includes retrieving (852) an email message (854). The method of FIG. 21 includes retrieving (852) an email message (854). Retrieving (852) an email message (854) may be carried out by retrieving one or more email messages from an email server (992). In the example of FIG. 21, a consolidated content management server (114) retrieves email messages for synthesizing into a media file for delivery to a digital audio player.

The method of FIG. 21 also includes extracting text (856) from the email message (854). The principal parts of an email message are the header, the body, and any attachments to the email. The header contains information including sender, intended recipient, date, intended courtesy copy recipients, subject of the message, and others as will occur to those of skill in the art. The body of the email message contains the content of the message itself. The attachments are typically files attached to the email message. Extracting text from the email message according to the method of FIG. 21 may include extracting text from an email message header. Extracting text from the email message according to the method of FIG. 21 may also include extracting text from an email message body. RFC 822 outlines a standard specifying the syntax for messages within the framework of email.

The method of FIG. 21 also includes creating (860) a media file (810). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which the synthesized email is to be rendered.

The method of FIG. 21 also includes storing (868) the extracted text (858) of the email message (854) as metadata (862) associated with the media file (810). Storing (868) the extracted text (858) of the email message (854) as metadata (862) associated with the media file (810) may be carried out by inserting the extracted text in the media file itself, such as by inserting the extracted text in an ID3 tag in an MPEG file as discussed below with reference to FIG. 21. Storing the extracted text of the email message as metadata associated with the media file may be also carried out by storing the extracted text in a metadata file associated with the media file such as by storing the extracted text in an eXtenxible markup language ('XML') library file associated with an AAC compressed MPEG 4 file as above below with reference to FIGS. 19 and 20.

Storing (868) the extracted text (858) of the email message (854) as metadata (862) associated with the media file (810) provides a vehicle for visually rendering the extracted email text on a display screen of a digital audio player without modification of the digital audio player. The method of FIG. 21 therefore allows email to be rendered on a digital audio player that does no support displaying conventional email messages.

As discussed above, the extracting text from the email message may be carried out by extracting text from an email message header. Such header information may be extracted and stored in association with a predefined metadata field supported by the digital audio player upon which the extracted text is to be rendered. Consider for further explanation the following example. The identification of a sender of an email and the subject of the email is extracted from an email message and stored as metadata in association with a predefined metadata field for 'Artist' and 'Song' supported by an iPod digital audio player. In such an example, the extracted header information is rendered in predefined metadata fields on the iPod allowing a user to navigate the header information of the email as the user normally navigates the metadata of music files.

The extracted text from the email message may also include text from an email message body. Such extracted text of the body may also be associated with a predefined metadata field supported by the digital audio player upon which the extracted body text is to be rendered. Continuing with the example above, the extracted text from the body 'may be associated in the 'Song' field supported by an iPod digital audio player. In such an example, the extracted text from the body is rendered in predefined metadata fields on the ipod when the user selects the file associated with the extracted body text in the same manner as a user selects a song in a media file. The user may advantageously view the email in the display screen of the iPod.

Figure 22:
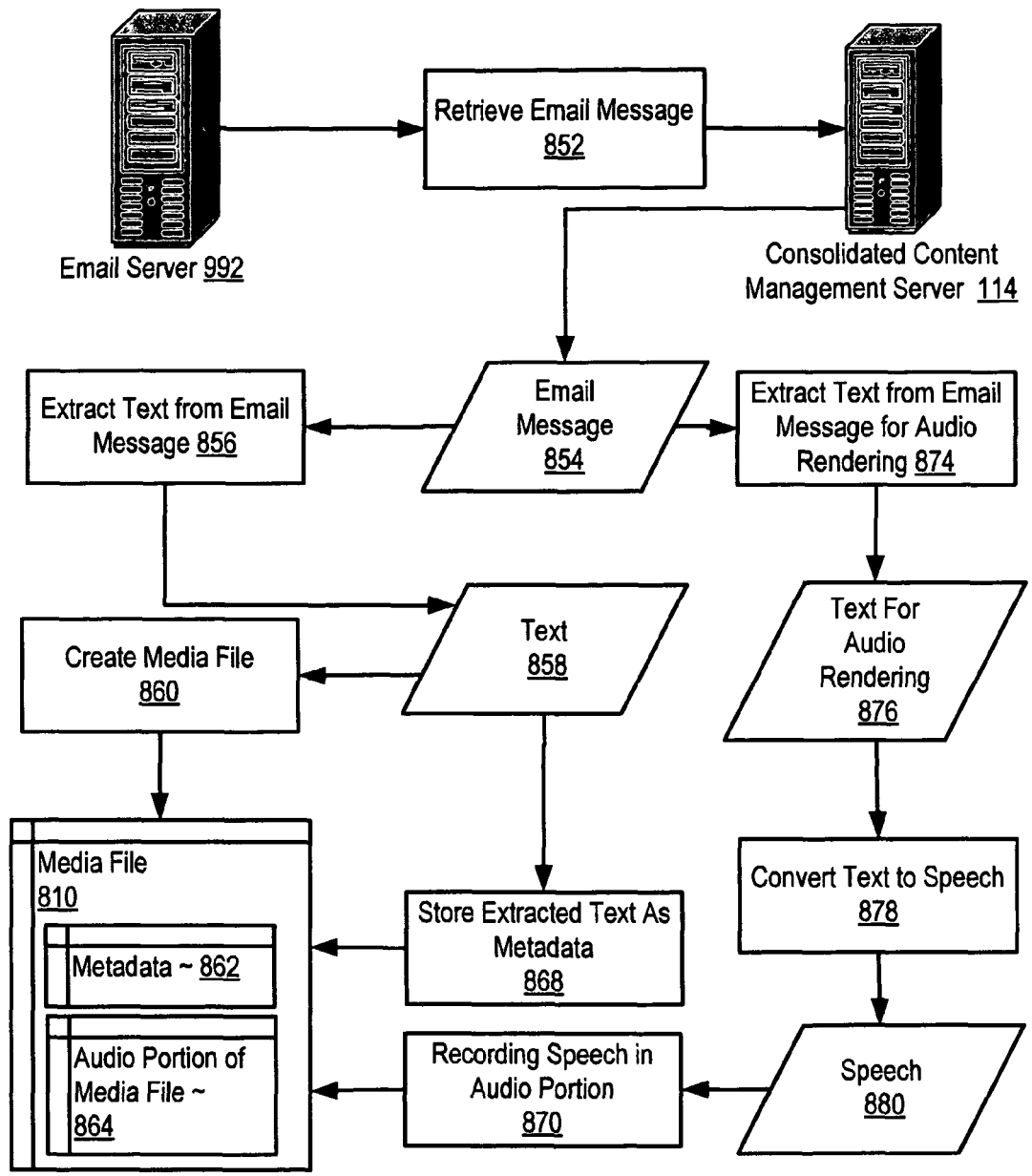

In the examples above, extracted email text is displayed on the display screen of a digital audio player for visual rendering of the email on the display screen of a digital audio player. Some or all of the extracted text may also be converted to speech for audio rendering by the digital audio player. For further explanation, FIG. 22 sets forth another flow chart illustrating an exemplary method for synthesizing email content into synthesized content in a media file for delivery to a particular digital audio player. The method of FIG. 22 includes retrieving (852) an email message (854). Retrieving (852) an email message (854) may be carried out by retrieving one or more email messages from an email server (992). In the example of FIG. 22 a consolidated content management server (114) retrieves email messages for synthesizing into a media file for delivery to a digital audio player.

The method of FIG. 22 also includes extracting text (856) from the email message (854). As discussed above, the principal parts of an email message are the header, the body, and any attachments to the email. The header contains information including sender, intended recipient, date, intended courtesy copy recipients, subject of the message, and others as will occur to those of skill in the art. The body of the email message contains the content of the message itself. The attachments are typically files attached to the email message. Extracting text from the email message according to the method of FIG. 22 may include extracting text from an email message header. Extracting text from the email message according to the method of FIG. 22 may also include extracting text from an email message body. RFC 822 outlines a standard specifying the syntax for messages within the framework of email.

The method of FIG. 22 also includes creating (860) a media file (810). As discussed above, examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which the synthesized email is to be rendered.

The method of FIG. 22 also includes storing (868) the extracted text (858) of the email message (854) as metadata (862) associated with the media file (810). Storing (868) the extracted text (858) of the email message (854) as metadata (862) associated with the media file (810) may be carried out by inserting the extracted text in the media file itself, such as by inserting the extracted text in an ID3 tag in an MPEG file as discussed above with reference to FIG. 21. Storing the extracted text of the email message as metadata associated with the media file may also be carried out by storing the extracted text in a metadata file associated with the media file such as by storing the extracted text in an eXtenxible markup language ('XML') library file associated with an AAC compressed MPEG 4 file as above below with reference to FIGS. 19 and 20.

The method of FIG. 22 advantageously provides a vehicle for storing header information such as the sender, intended recipient, data, time, subject, and so on as metadata in the media file. Such header information may then be displayed visually on a display screen of digital audio player.

The method of FIG. 22 also provides a vehicle for storing portions of the email such as the body of the email in the audio portion of the media file for audio rendering. The method of FIG. 22, therefore, also includes extracting (874) text (876) from the email message (854) for audio rendering on the digital audio player. Extracting text from the email message according to the method of FIG. 22 may therefore also include extracting text from an email message body for audio rendering on a digital audio player.

The method of FIG. 22 also includes converting (878) the text (876) to speech (880) and recording (870) the speech (880) in the audio portion (864) of the media file (810). Converting the text to speech and recording the speech in the audio portion of the media file may be carried out by processing the extracted text using a text-to-speech engine in order to produce a speech presentation of the extracted email text and then recording the speech produced by the text-speech-engine in the audio portion of a media file.

Examples of speech engines capable of converting extracted text to speech for recording in the audio portion of a media filed include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, these systems have the highest potential for sounding like natural speech, but concatenative systems require large amounts of database storage for the voice database.

As discussed above, synthesizing content of disparate data types into synthesized content in a media file (810) for delivery to a particular digital audio player may include synthesizing RSS content for delivery to a digital audio player. For further explanation, therefore, FIG. 23 sets forth a flow chart illustrating an exemplary method for synthesizing (804) RSS content into synthesized content in a media file (810) for delivery to a particular digital audio player (108). The method of FIG. 23 includes retrieving (950), through an RSS feed, RSS content (952). Retrieving, through an RSS feed, RSS content may be carried out by invoking one or more hyperlinks provided in the RSS feed and retrieving an RSS web page or other markup document containing the RSS content.

Figure 23:
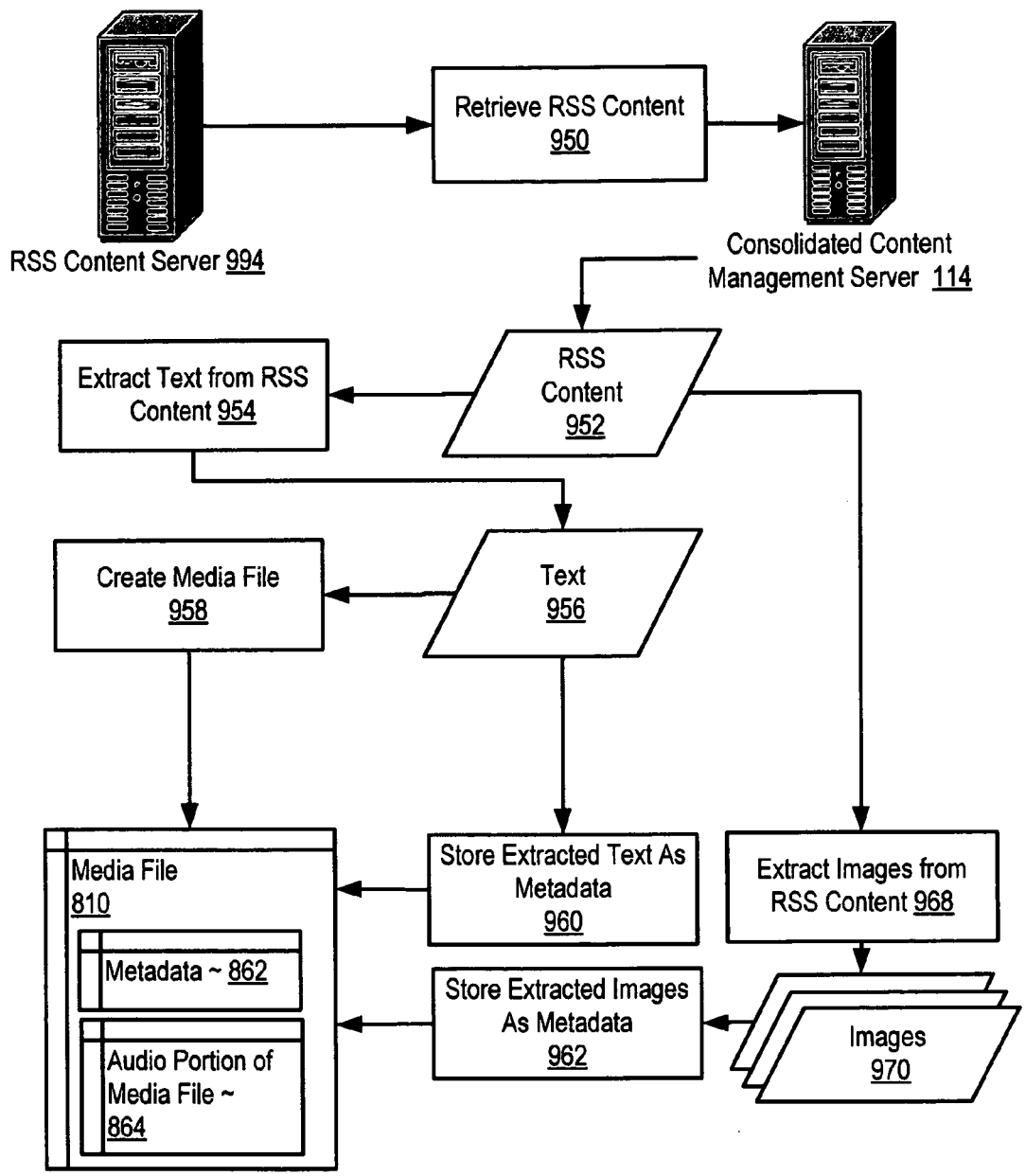
FIG. 23 sets forth a flow chart illustrating an exemplary method for synthesizing RSS content into synthesized content in a media file for delivery to a particular digital audio player for visually presenting the RSS content on a display screen of the digital audio player FIG. 24 sets forth a flow chart illustrating another exemplary method for synthesizing RSS content into synthesized content in a media file for delivery to a particular digital audio player that includes converting a portion of the RSS content to speech for audio presentation on a digital audio player.

The method of FIG. 23 also includes extracting (954) text (956) from the RSS content (952). RSS content is typically presented in a web page or other markup document accessible through a browser. Such a web page or markup document therefore includes display text and images for display to a user and markup dictating the presentation of the content. Extracting text from the RSS content therefore may be carried out by retrieving display text from a web page or markup document. Such extracted display text implements some or all of the text content of the RSS content available through the RSS feed.

The method of FIG. 23 includes creating (958) a media file (810). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which RSS content is to be rendered.

The method of FIG. 23 includes storing (960) the extracted text (956) of the RSS content (952) as metadata (862) associated with the media file (810). Storing (960) the extracted text (956) of the RSS content (952) as metadata (862) associated with the media file (810) may be carried out by inserting the extracted text in the media file itself, such as by inserting the extracted text in an ID3 tag in an MPEG file as discussed above with reference to FIG. 19. Storing (960) the extracted text (956) of the RSS content (952) as metadata (862) associated with the media file (810) may also be carried out by storing the extracted text in a metadata file associated with the media file such as by storing the extracted text in an eXtenxible markup language ('XML') library file associated with an AAC compressed MPEG 4 file as discussed above with reference to FIG. 20.

The method of FIG. 23 also includes extracting (968) one or more images (970) from the RSS content (952). As discussed above, RSS content is typically presented in a web page or other markup document accessible through a browser. Such a web page or markup document therefore includes display text and images for display to a user and markup dictating the presentation of the content. Extracting (968) one or more images (970) from the RSS content (952) therefore may be carried out by retrieving images from a web page or markup document. Such images may be implemented as separate files referenced within the web page or markup document such as JPEG files, .pdf files, and others as will occur to those of skill in the art.

The method of FIG. 23 also includes storing (962) the extracted images (970) as metadata (862) associated with the media file (810). Storing (962) the extracted images (970) as metadata (862) associated with the media file (810) may be carried out by inserting the extracted images in the media file itself, such as by inserting the extracted images in an ID3 tag in an MPEG file as discussed above with reference to FIG. 19. Storing (962) the extracted images (970) as metadata (862) associated with the media file (810) may also be carried out by storing the extracted images in a metadata file associated with the media file such as by storing the extracted text in an eXtenxible markup language ('XML') library file associated with an AAC compressed MPEG 4 file as discussed above with reference to FIG. 20.

Storing the extracted RSS text and images as metadata associated with the media file provides a vehicle for visually rendering the extracted RSS content on a display screen of a digital audio player without modification of the digital audio player. The method of FIG. 23 therefore allows RSS content to be rendered on a digital audio player that does not support displaying conventional RSS content.

In the example of FIG. 23, text is extracted from the RSS content itself and stored as metadata associated with the media file. In many embodiments, text may also be extracted from the RSS feed and also stored as metadata associated with the media file. Such extracted text may usefully be associated with predefined metadata fields such that the summaries and other metadata provided in the RSS feed are useful in navigating the stored RSS content on the digital audio player.

In the example of FIG. 23, text extracted from the RSS content is associated with the media file such that the text may be displayed on the display screen of the digital audio player. Synthesizing RSS content for delivery to a digital audio player may also include converting a portion of the RSS content to speech and recording the speech in the audio portion of a media file for audio presentation of the RSS content. For further explanation, therefore, FIG. 24 sets forth a flow chart illustrating another exemplary method for synthesizing (804) RSS content into synthesized content in a media file (810) for delivery to a particular digital audio player (108) that includes converting a portion of the RSS content to speech for audio presentation on a digital audio player. The method of FIG. 24 includes retrieving (852), through an RSS feed, RSS content (952). Retrieving, through an RSS feed, RSS content may be carried out by invoking one or more hyperlinks provided in the RSS feed and retrieving an RSS web page or other markup document containing the RSS content.

Figure 24:
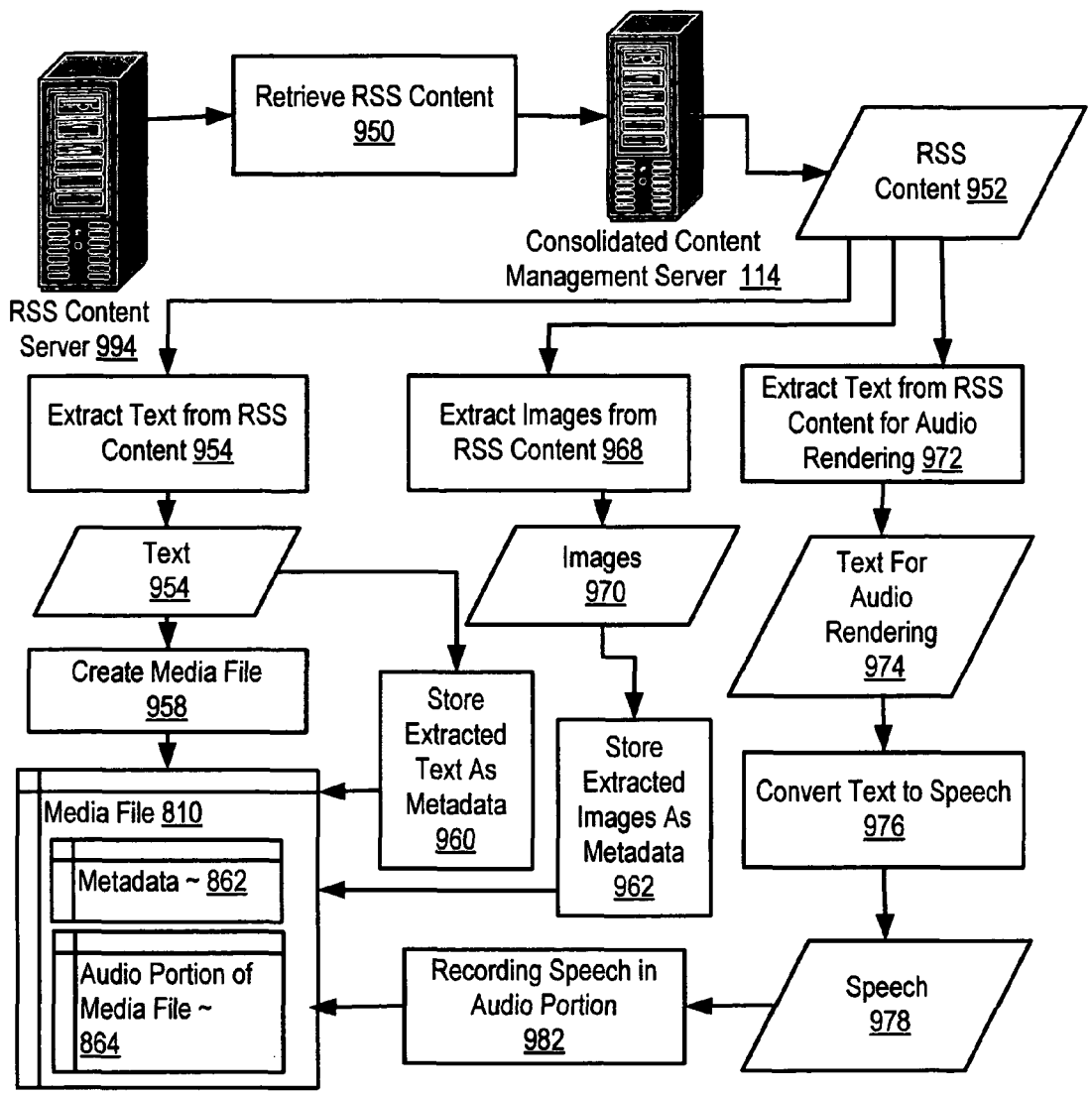

The method of FIG. 24 also includes extracting (954) text (956) from the RSS content (952). RSS content is typically presented in a web page or other markup document accessible through a browser. Such a web page or markup document therefore includes display text and images for display to a user and markup dictating the presentation of the content. Extracting text from the RSS content therefore may be carried out by retrieving display text from a web page or markup document. Such extracted display text implements some or all of the text content of the RSS content available through the RSS feed.

The method of FIG. 24 includes creating (958) a media file (810). Examples of media files include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art. Creating a media file typically includes creating a media file that is supported by a digital audio player upon which RSS content is to be rendered.

The method of FIG. 24 includes storing (960) the extracted text (956) of the RSS content (952) as metadata (862) associated with the media file (810). Storing (960) the extracted text (956) of the RSS content (952) as metadata (862) associated with the media file (810) may be carried out by inserting the extracted text in the media file itself, such as by inserting the extracted text in an ID3 tag in an MPEG file as discussed above with reference to FIG. 19. Storing (960) the extracted text (956) of the RSS content (952) as metadata (862) associated with the media file (810) may also be carried out by storing the extracted text in a metadata file associated with the media file such as by storing the extracted text in an eXtenxible markup language ('XML') library file associated with an AAC compressed MPEG 4 file as discussed above with reference to FIG. 20.

The method of FIG. 24 also includes extracting (968) one or more images (970) from the RSS content (952). As discussed above, RSS content is typically presented in a web page or other markup document accessible through a browser. Such a web page or markup document therefore includes display text and images for display to a user and markup dictating the presentation of the content. Extracting (968) one or more images (970) from the RSS content (952) therefore may be carried out by retrieving images from a web page or markup document. Such images may be implemented as separate files referenced within the web page or markup document such as JPEG files, .pdf files, and others as will occur to those of skill in the art.

The method of FIG. 24 also includes storing (962) the extracted images (970) as metadata (862) associated with the media file (810). Storing (962) the extracted images (970) as metadata (862) associated with the media file (810) may be carried out by inserting the extracted images in the media file itself, such as by inserting the extracted images in an ID3 tag in an MPEG file as discussed above with reference to FIG. 19. Storing (962) the extracted images (970) as metadata (862) associated with the media file (810) may also be carried out by storing the extracted images in a metadata file associated with the media file such as by storing the extracted text in an eXtenxible markup language ('XML') library file associated with an AAC compressed MPEG 4 file as discussed above with reference to FIG. 20.

The RSS content synthesized according to the method of FIG. 24 advantageously allows the extracted RSS text to be displayed on the display screen of a digital audio player that does not support rendering conventional RSS content.

In the example of FIG. 24, text is extracted from the RSS content itself and stored as metadata associated with the media file. In many embodiments, text may also be extracted from the RSS feed and also stored as metadata associated with the media file. Such extracted text may usefully be associated with predefined metadata fields such that the summaries and other metadata provided in the RSS feed are useful in navigating the stored RSS content on the digital audio player.

The method of FIG. 24 includes extracting (972) text (974) from the RSS content (952) for audio rendering on the digital audio player. As discussed above, RSS content is typically presented in a web page or other markup document accessible through a browser. Such a web page or markup document therefore includes display text and images for display to a user and markup dictating the presentation of the content. Extracting text from the RSS content for audio rendering therefore may be carried out by retrieving display text from a web page or markup document for inclusion in the audio portion of the media file and stored for audio playback to user. Such extracted display text implements some or all of the text content accessible through the RSS feed. Examples of extracted text usefully rendered as audio include the full body content of the RSS content.

The method of FIG. 24 also includes converting (976) the text (974) to speech (978) and recording (982) the speech in the audio portion of the media file. Converting (976) the text (974) to speech (978) and recording (982) the speech in the audio portion of the media file may be carried out by processing the extracted text using a text-to-speech engine in order to produce a speech presentation of the extracted RSS content text and then recording the speech produced by the text-speech-engine in the audio portion of a media file as described above in discussing synthesizing email messages with reference to FIG. 22.

Associating User Selected Content Management Directives with a User Selected Rating As discussed above, ratings advantageously provide a mechanism for invoking content management directives on a consolidated content server without requiring modification of a digital audio player upon which the content under management is rendered. The particular content management directives may be user selected and those selected content management directives may be associated with a user selected rating to invoke the content management directive. For further explanation, therefore, FIG. 25 sets forth a flow chart illustrating an exemplary method for associating user selected content management directives with a user selected rating. The method of FIG. 25 includes presenting (902) to a user (100) a plurality of predefined content management directives (822). Presenting (902) to a user (100) a plurality of predefined content management directives (822) may be carried out by presenting to a user a list of predefined and available content management directives. Such a list of content management directives may be presenting to the user through a display screen on a browser, such as the screen discussed below with reference to FIG. 26.

Figure 25:
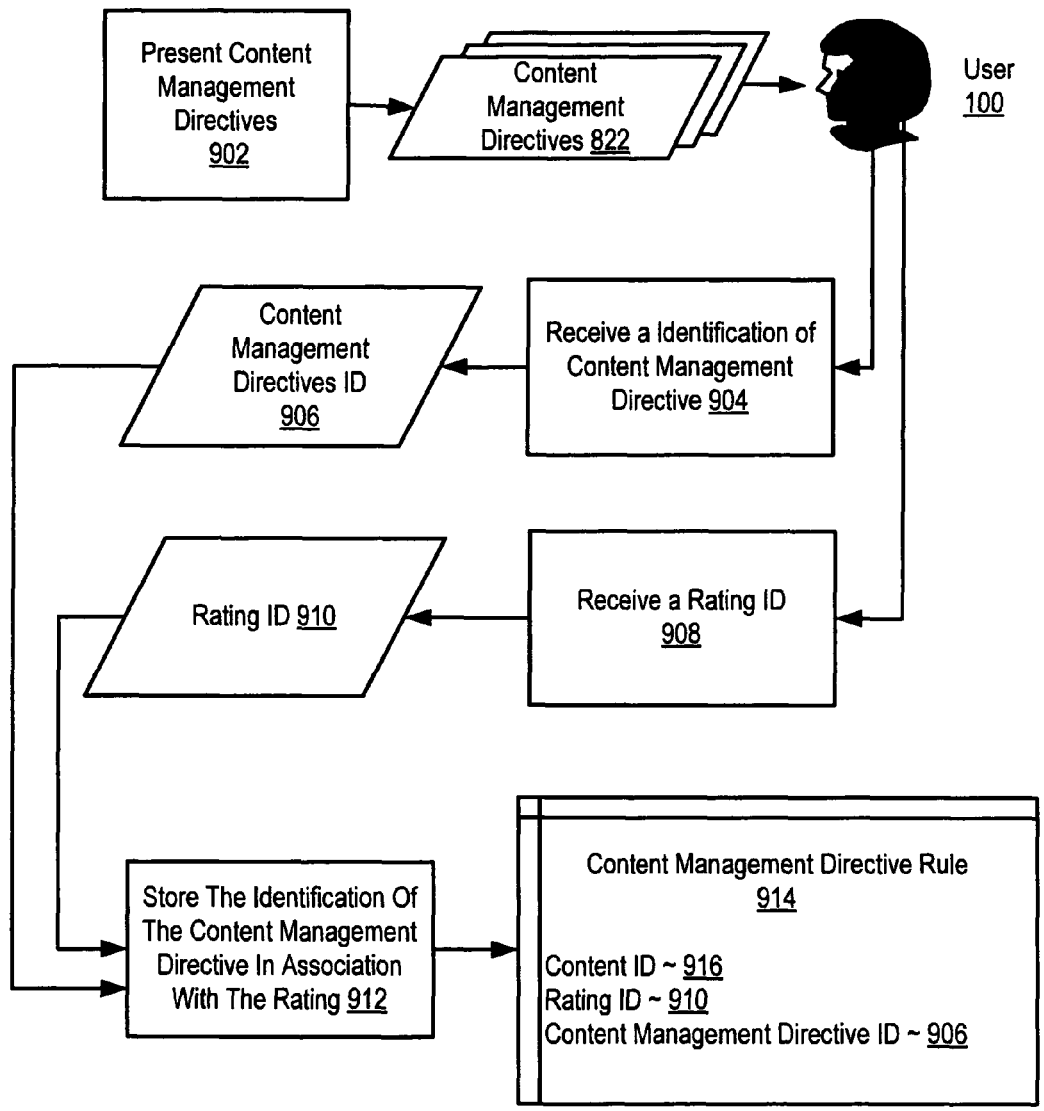
FIG. 25 sets forth a flow chart illustrating an exemplary method for associating user selected content management directives with a user selected rating.

The method of FIG. 25 includes receiving (904) from a user (100) an identification (906) of a particular content management directive. Receiving (904) from a user (100) an identification (906) of a particular content management directive may be carried out by receiving a user selection of a particular content management directive through for example a GUI action supported by a display screen, such as the display screen discussed below with reference to FIG. 26.

The method of FIG. 25 also includes receiving (908) from a user (100) an identification (910) of the rating to invoke the content management directive (906). Receiving (908) from a user (100) an identification (910) of the rating to invoke the content management directive (906) typically includes receiving a rating supported by the digital audio player upon which the content is to be rendered. For example, the iPod® available from Apple® supports a five-star rating system that provides assigning to content one of five ratings: one star, two stars, three stars, four stars, or five stars. Receiving (908) from a user (100) an identification (910) of the rating to invoke the content management directive (906) through for example another GUI action supported by a display screen, such as the display screen discussed below with reference to FIG. 26.

Receiving (908) from a user (100) an identification (910) of the rating to invoke the content management directive (906) may also include receiving a user defined rating. As discussed above, .mp4 files support flexible ID3v2 tags and therefore a user defined rating scheme may implement many ratings for an .mp4 file.

The method of FIG. 25 also includes storing (912) the identification (906) of the content management directive in association with the rating to invoke the content management directives and the content upon which to invoke the content management directive. Storing (912) the identification (906) of the content management directive in association with the rating to invoke the content management directives may be carried out by creating a data structure and including in the data structure the identification (906) of the content management directive in association with the rating to invoke the content management directives. In the example of FIG. 25 a content management directives rule (914) is implemented as a record including a content ID (916) uniquely identifying the content upon which a content management directive is invoked upon receiving a rating associated with the content and the content management directive. The content management directives rule (914) includes a rating ID (910) identifying the rating tot invoke the content management directive and a content management directive ID (906) identifying the content management directive to be invoked upon receiving a user assigned rating to the content.

Storing the identification of the content management directive in association with the rating to invoke the content management directives may be used to create a rule associating the content management directive, the rating, and content to be managed by the content management directive. That is, embodiments of the present invention may also include creating a rule associating the content management directive, the rating, and content to be managed by the content management directive. For further explanation, therefore, FIG. 26 sets forth a line drawing of a content management directive rule creation page (930) useful in associating user selected content management directives with a user selected rating through the creation of a content management directive rule.

Figure 26:
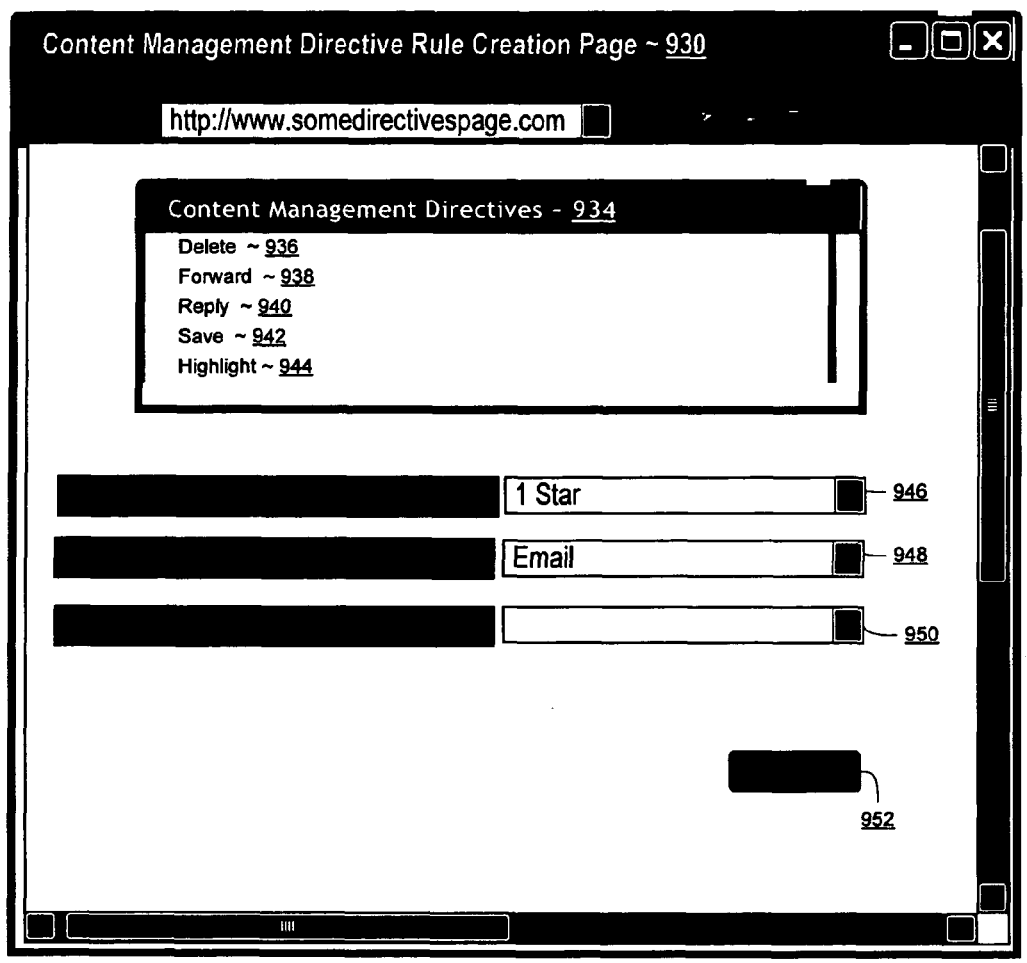
FIG. 26 sets forth a line drawing of a content management directive rule creation page useful in associating user selected content management directives with a user selected rating through the creation of a content management directive rule.

The content management directive rule creation page (930) of FIG. 26 includes a GUI widget (934) that includes a presentation for a user of a plurality of predefined content management directives (934). The predefined content management directives presented in the example of FIG. 26 are directed toward content management of email. The presented content management directive includes a 'delete' directive (936) that when executed deletes an identified email message. The presented content management directives include a 'forward directive (938) that when executed forwards an identified email message to a particular recipient. The presented content management directives also include a 'reply directive (940) that when executed replies to the sender of an identified email message. The presented content management directives include a 'save' directive (942) that when executed saves an identified email message. The presented content management directives include a 'highlight' directive (944) that when executed flags an identified email message for increased attention.

The content management directive rule creation page (930) of FIG. 26 also includes a pull down selection box (946) for receiving from a user an identification of the rating to invoke a selected content management directive. In the example of FIG. 26 a user has selected a '1 star' rating, one of the five star ratings supported by the iPod® from Apple®. The example of FIG. 26 uses the five star ratings for explanation, and not for limitation. In fact, a content management directive rule creation page may also be configured to receive a user defined rating.

The content management directive rule creation page (930) of FIG. 26 also includes a pull down selection box (948) for receiving an identification of the content type of content upon which the selected content management directive will operate. In the example of FIG. 26 a user has selected 'email' as the type of synthesized content upon which to invoke the selected content management directives upon receiving a rating associated with the invocation of that content management directive.

The content management directive rule creation page (930) of FIG. 26 also includes a pull down selection box (950) for receiving from a user an identification of a particular content management directive among those presented. The content management directive rule creation page (930) of FIG. 26 also includes a GUI 'select' button (952) for selecting one of the presented content management directives.

Upon receiving an identification of the rating, the content management directive and the content upon which to invoke the content management directive, a content management directive rule creation engine may create a rule associating the content management directive, the rating, and content to be managed by the content management directive. Such a rule may be stored by embedding the rule in the media file of the content. Embedding the rule in the media file containing of the content may be carried out by embedding the rule in an ID3 tag in for example an .mp4 file. Alternatively, a rule may be stored in a metadata file such as an XML library file such as those implemented by the iTunes® digital audio player application.

Exemplary embodiments of the present invention are described largely in the context of a fully functional computer system for associating user selected content management directives with a user selected rating. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for associating user selected content management directives with a user selected rating, the method carried out by a computer comprising a computer processor and computer memory operatively coupled to the computer processor, the method comprising:
presenting to a user a plurality of predefined content management directives, wherein the content management directives comprise actions performed on content by a content management server;
receiving from the user an identification of a particular content management directive;
receiving from the user an identification of the user selected rating for entering into a media device to invoke the content management directive;
storing, at the content management server, the identification of the content management directive in association with the user selected rating to invoke the content management directives;
creating a rule associating the content management directive, the user selected rating and content to be managed by the content management server;
embedding the rule in the media file of the content;
wherein said actions performed on the content are performed by the content management server in response to detecting entry of the user selected rating associated with the content management directive;
wherein said actions performed on the content include a plurality of actions comprising deleting the media file, highlighting the media file, forwarding the media file and copying the media file;
wherein said actions are performed in response to detecting entry, at the media device, of the user selected rating;
wherein said content comprises at least one of an email, a word processing document, a calendar document, an XML document or a WML file; and
wherein the media device is a digital audio player.

2. The method of claim 1 wherein receiving from the user an identification of the user selected rating to invoke the content management directives further comprises receiving a predefined rating.

3. The method of claim 1 wherein receiving from the user an identification of the user selected rating to invoke the content management directives further comprises receiving a user defined rating.

4. The method of claim 1, further comprising: informing the content management server of the rating associated with the content management directive;
wherein the media file is sent to the content management server to inform the content management server of the rating.

5. A system for associating user selected content management directives with a user selected rating, the system comprising:
a computer processor;
a computer memory operatively coupled to the computer processor;
the computer memory having disposed within it computer program instructions, when executed by the computer processor, is configured to:
presenting to a user a plurality of predefined content management directives, wherein the content management directives comprise actions performed on content by a content management server;
receiving from the user an identification of a particular content management directive;
receiving from the user an identification of the user selected rating for entering into a media device to invoke the content management directive;
storing, at the content management server, the identification of the content management directive in association with the user selected rating to invoke the content management directives;
creating a rule associating the content management directive, the user selected rating and content to be managed by the content management server;
embedding the rule in the media file of the content;
wherein said actions performed on the content are performed by the content management server in response to detecting entry of the user selected rating associated with the content management directive;
wherein said actions performed on the content include a plurality of actions comprising deleting the media file, highlighting the media file, forwarding the media file and copying the media file;
wherein said actions are performed in response to detecting entry, at the media device, of the user selected rating;
wherein said content includes comprises at least one of an email, a word processing document, a calendar document, an XML document or a WML file; and
wherein the media device is a digital audio player.

6. The system of claim 5 wherein computer program instructions configured to receive from the ft user an identification of the user selected rating to invoke the content management directives further comprise computer program instructions configured to receive a predefined rating.

7. The system of claim 5 wherein computer program instructions configured to receive from the user an identification of the user selected rating to invoke the content management directives further comprise computer program instructions configured to receive a user defined rating.

8. The system of claim 5, the computer program instructions further being configured to:
inform the computer processor of the rating associated with the content management directive;
wherein the media file is sent to the computer processor from the media device to inform the computer processor of the rating.

9. A computer program product for associating user selected content management directives with user selected ratings, the computer program product embodied on a non-transitory computer-readable storage medium, the computer program product comprising:
computer program instructions for presenting to a user a plurality of predefined content management directives, wherein the content management directives comprise actions performed on content by a content management server;
computer program instructions for receiving from the user an identification of a particular content management directive;
computer program instructions for receiving from the user an identification of the user selected rating for entering into a media device to invoke the content management directive; and
computer program instructions for storing, at the content management server, the identification of the content management directive in association with the user selected rating to invoke the content management directives;

computer program instructions for creating a rule associating the content management directive, the user selected rating and content to be managed by the content management server;

computer program instructions for embedding the rule in the media file of the content;

wherein said actions performed on the content are performed by the content management server in response to detecting entry of the user selected rating associated with the content management directive;

wherein the actions performed on the content include a plurality of actions comprising deleting the media file, highlighting the media file, forwarding the media file and copying the media file;

wherein said actions are performed in response to detecting entry, at the media device, of the user selected rating;

wherein said content comprises at least one of an email, a word processing document, a calendar document, an XML document or a WML file;

wherein the media device is a digital audio player; and wherein the computer program instructions are stored on a computer memory and executed by a computer processor.

10. The computer program product of claim 9 wherein computer program instructions for receiving from the user an identification of the user selected rating to invoke the content management directives further comprise computer program instructions for receiving a predefined rating.

11. The computer program product of claim 9 wherein computer program instructions for receiving from the user an identification of the user selected rating to invoke the content management directives further comprise computer program instructions for receiving a user defined rating.

12. The computer program product of claim 9, the computer program product comprising: computer program instructions for informing the content management server of the rating associated with the content management directive;

wherein the media file is sent to the content management server to inform the content management server of the rating.

* * * * *